United States Patent
Cho

(10) Patent No.: US 9,406,278 B2
(45) Date of Patent: Aug. 2, 2016

(54) PORTABLE DEVICE AND METHOD FOR CONTROLLING SCREEN BRIGHTNESS THEREOF

(71) Applicant: Samsung Electronics Co., Ltd., Suwon-si, Gyeonggi-do (KR)

(72) Inventor: Youngtack Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 69 days.

(21) Appl. No.: 14/548,989

(22) Filed: Nov. 20, 2014

(65) Prior Publication Data
US 2015/0138122 A1 May 21, 2015

(30) Foreign Application Priority Data

Nov. 20, 2013 (KR) .................... 10-2013-0141742

(51) Int. Cl.
*G09G 5/10* (2006.01)
*G09G 5/00* (2006.01)
*G06F 3/041* (2006.01)
*G09G 3/34* (2006.01)
*G06F 3/0354* (2013.01)

(52) U.S. Cl.
CPC ............... *G09G 5/10* (2013.01); *G06F 3/0416* (2013.01); *G09G 3/3406* (2013.01); *G09G 5/003* (2013.01); *G06F 3/03547* (2013.01); *G09G 2320/0626* (2013.01); *G09G 2320/0653* (2013.01); *G09G 2354/00* (2013.01); *G09G 2360/144* (2013.01)

(58) Field of Classification Search
None
See application file for complete search history.

(56) References Cited

U.S. PATENT DOCUMENTS

| | | | |
|---|---|---|---|
| 2009/0207154 A1* | 8/2009 | Chino ................... | G06F 3/0416 345/175 |
| 2010/0194705 A1 | 8/2010 | Kim et al. | |
| 2011/0242044 A1* | 10/2011 | Liu ........................ | G06F 3/0416 345/174 |
| 2012/0071149 A1* | 3/2012 | Bandyopadhyay ... | G06F 1/1643 455/418 |
| 2013/0113973 A1 | 5/2013 | Miao | |
| 2013/0222294 A1 | 8/2013 | Choi et al. | |
| 2013/0231161 A1 | 9/2013 | Hsu et al. | |

FOREIGN PATENT DOCUMENTS

EP    2 631 749 A2    8/2013

* cited by examiner

*Primary Examiner* — Nicholas Lee
*Assistant Examiner* — Duane N Taylor, Jr.
(74) *Attorney, Agent, or Firm* — Jefferson IP Law, LLP

(57) ABSTRACT

A portable device and a screen brightness control method thereof are provided. The portable device and related method can maintain the current screen brightness in overall consideration of a detected ambient illuminance, a touch of an input unit, and a user's direct touch. The portable device detects an ambient illuminance. If the detected ambient illuminance is less than a threshold value, the portable device calculates a first distance between an illuminance sensor and a touch of an input unit detected from a touch screen, and also calculates a second distance between the illuminance sensor and a user's direct touch detected from the touch screen. If the first distance is equal to or greater than the second distance, the portable device controls the touch screen to maintain the current screen brightness thereof.

20 Claims, 15 Drawing Sheets

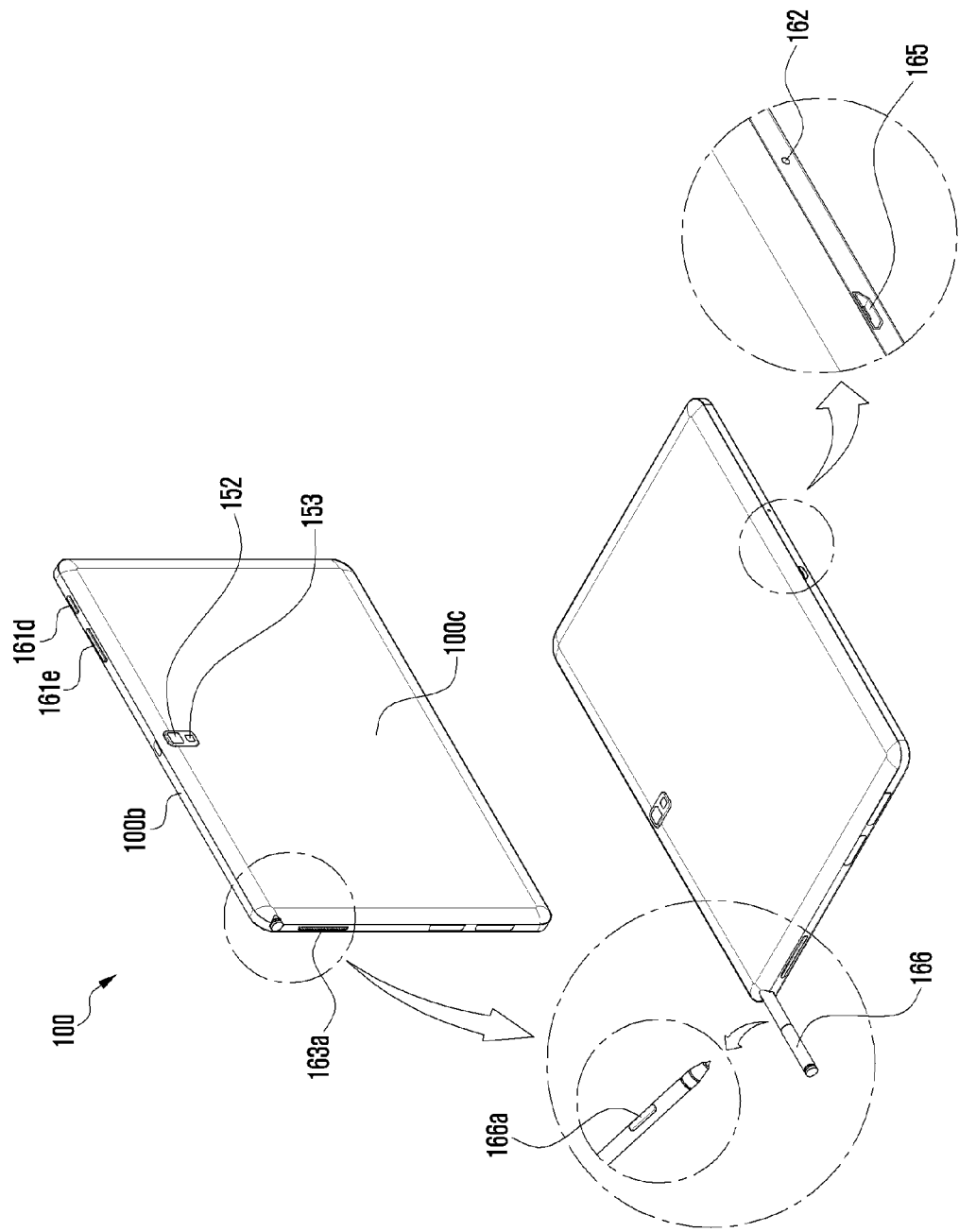

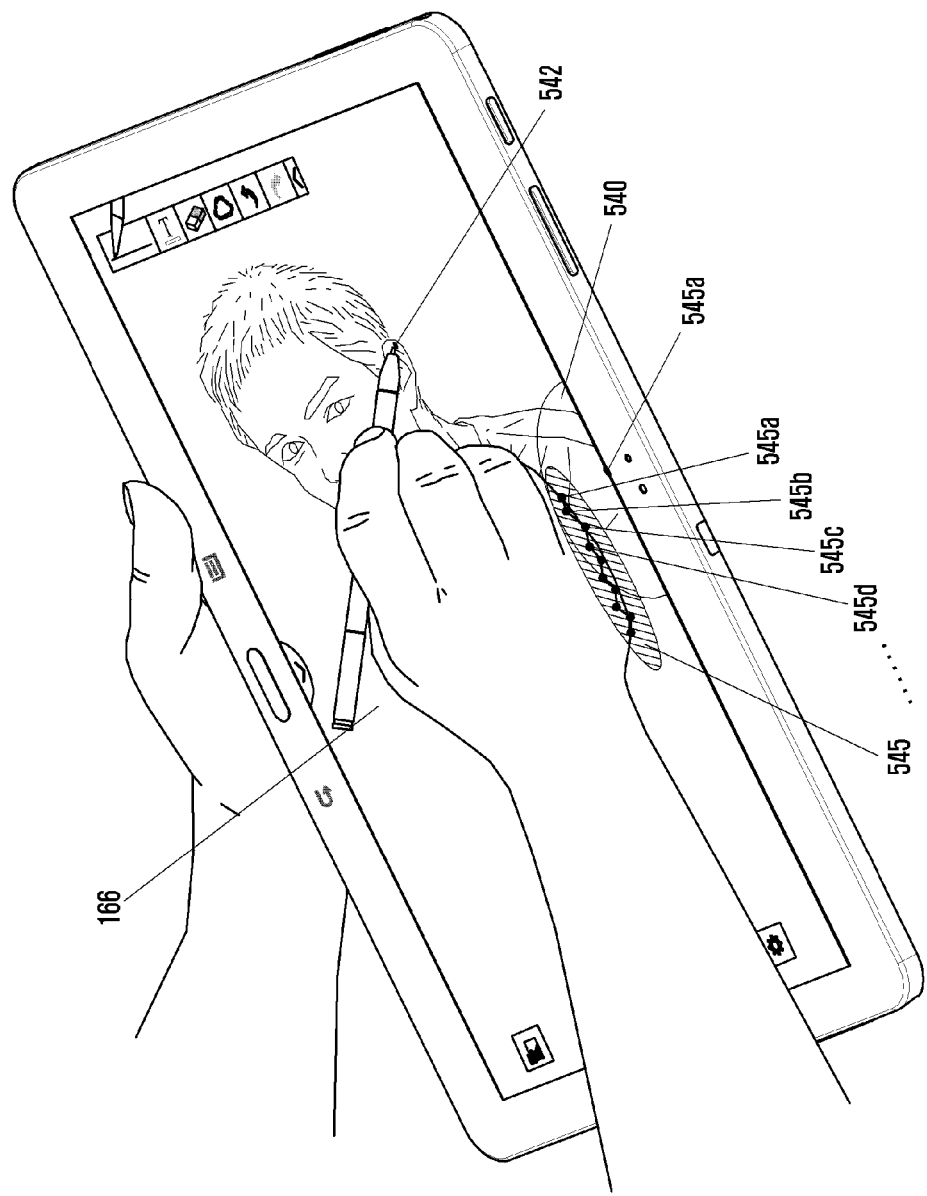

PORTABLE DEVICE AND METHOD FOR CONTROLLING SCREEN BRIGHTNESS THEREOF

CROSS-REFERENCE TO RELATED APPLICATION(S)

This application claims the benefit under 35 U.S.C. §119(a) of a Korean patent application filed on Nov. 20, 2013 in the Korean Intellectual Property Office and assigned Serial No. 10-2013-0141742, the entire disclosure of which is hereby incorporated by reference.

TECHNICAL FIELD

The present disclosure relates to a portable device and a screen brightness control method thereof. More particularly, the present disclosure relates to a portable device and a method for maintaining current screen brightness in overall consideration of a detected ambient illuminance, a touch of an input unit, and a user's direct touch.

BACKGROUND

With advances in technology, portable electronic devices now have the ability to offer a great variety of services and additional functions. Also, in order to increase the utility of portable electronic devices and to meet a user's requirements, many applications that are executable in such portable electronic devices have been developed in the art. For example, most portable electronic devices have a function to automatically adjust the brightness of a touch screen according to an ambient illuminance detected through an illuminance sensor. Additionally, some applications for supporting a handwriting and/or a drawing are now used in a portable electronic device together with a suitable input unit such as a stylus pen or a haptic pen.

However, when such a handwriting or drawing application is executed and used, the illuminance sensor formed at the front side of a portable device may be covered with a user's hand that is holding the input unit. If the portable electronic device is in an automatic screen brightness mode, the touch screen may become dark unintentionally due to a decreased illuminance caused by a user's hand covering the illuminance sensor.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a portable device and related screen brightness control method for maintaining current screen brightness in consideration of a detected ambient illuminance, a touch of an input unit, and a user's direct touch, even if a change in the ambient illuminance happens in a screen brightness auto mode.

In accordance with an aspect of the present disclosure, a method for controlling screen brightness of a portable device is provided. The method includes detecting an ambient illuminance around the portable device, if the detected ambient illuminance is less than a threshold value, calculating a first distance between an illuminance sensor and a touch of an input unit detected from a touch screen, calculating a second distance between the illuminance sensor and a user's direct touch detected from the touch screen, and, if the first distance is equal to or greater than the second distance, controlling the touch screen to maintain a current screen brightness thereof.

This method may further include activating a screen brightness auto mode of the portable device, wherein maintaining the current screen brightness includes inactivating the screen brightness auto mode.

In accordance with another aspect of the present disclosure, a method for controlling screen brightness of a portable device is provided. The method includes detecting an ambient illuminance around the portable device, if the detected ambient illuminance is less than a threshold value, detecting a touch of an input unit from the outside of a determination region defined on a touch screen, detecting a user's direct touch from the determination region, and maintaining a current screen brightness in response to detection of the touch or the input unit and the user's direct touch.

This method may further include activating a screen brightness auto mode of the portable device, wherein maintaining the current screen brightness includes inactivating the screen brightness auto mode.

In accordance with yet another aspect of the present disclosure, a portable device is provided. The portable device includes an illuminance sensor configured to detect an ambient illuminance around the portable device, a touch screen having an adjustable screen brightness, and a control unit configured to control the illuminance sensor and the touch screen, wherein if the detected ambient illuminance is less than a threshold value, and if a first distance between the illuminance sensor and a touch of an input unit detected from the touch screen is equal to or greater than a second distance between the illuminance sensor and a user's direct touch detected from the touch screen, the control unit is further configured to control the touch screen to maintain a current screen brightness thereof.

In accordance with another aspect of the present disclosure, a portable device is provided. The portable device includes an illuminance sensor configured to detect an ambient illuminance around the portable device, a touch screen having an adjustable screen brightness, and a control unit configured to control the illuminance sensor and the touch screen, wherein if the detected ambient illuminance is less than a threshold value, the control unit is further configured to maintain a current screen brightness in response to detection of a touch of an input unit from the outside of a determination region defined on the touch screen and detection of a user's direct touch from the determination region.

In accordance with another aspect of the present disclosure, a portable device is provided. The portable device includes an illuminance sensor configured to detect an ambient illuminance around the portable device, a touch screen having an adjustable screen brightness, and a control unit configured to control the illuminance sensor and the touch screen, wherein when the detected ambient illuminance is less than a threshold value, the control unit is further configured to maintain a current screen brightness in response to a first touch of a user's finger detected from the outside of a determination region defined on the touch screen and a second touch of a user's palm detected from the determination region.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1B is a perspective view illustrating the rear side of a portable device according to an embodiment of the present disclosure.

FIGS. 5A, 5B, 5C, and 5D are diagrams illustrating a method for controlling the screen brightness of a portable device according to an embodiment of the present disclosure.

Throughout the drawings, it should be noted that like reference numbers are used to depict the same or similar elements, features, and structures

DETAILED DESCRIPTION

Figure 1A:
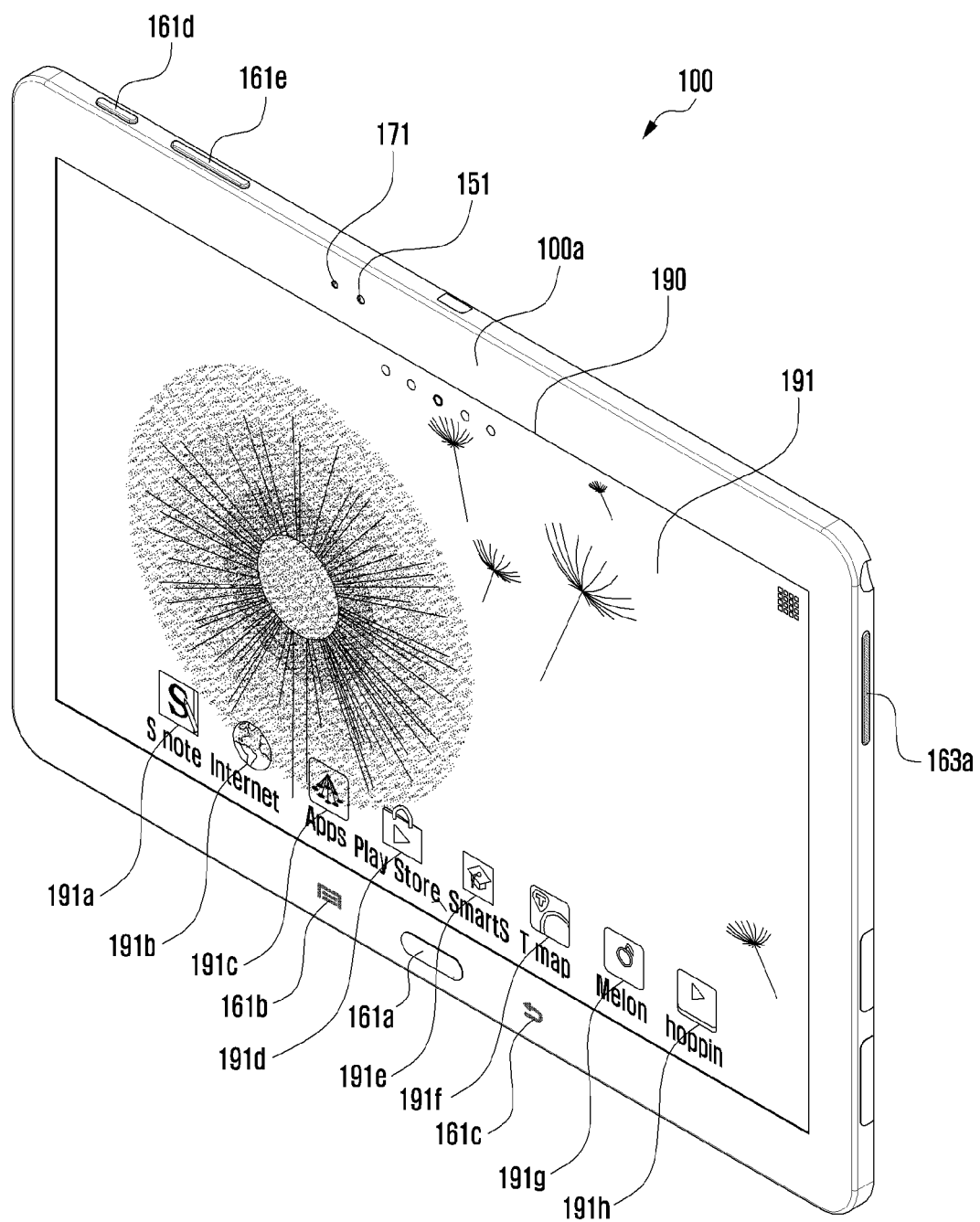
FIG. 1A is a perspective view illustrating the front side of a portable device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It will be understood that, although the terms "first", "second", "third", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element", "component", "region", "layer" or "section" discussed below could be termed a second element, component, region, layer or section without departing from the teachings herein.

It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It is also to be understood that the singular forms "a", "an", and "the" include plural referents unless the context clearly dictates otherwise. Thus, for example, reference to "a device" includes reference to one or more of such devices.

In this disclosure, the term "application" refers to software that is executed on a computer Operating System (OS) or a mobile OS and used by a user. For example, various applications such as a word processor, spreadsheet, Social Network System (SNS), chatting, map, music player, video player, and the like are well known and widely used. According to various embodiments of the present disclosure, an application refers to software which is usable by a user through an input unit.

Additionally, the term "widget" refers to a mini application which is part of a graphic user interface (GUI) that supports an efficient interaction between a user and an application or OS. For example, a weather widget, a calculator widget, a clock widget, and other various widgets are well known and widely used. A widget may be installed in the form of a shortcut icon in a desktop, portable device, blog, homepage, etc., thus allowing a user to directly use a desired service through a click only without requiring entry into a web browser. Also, a widget may contain a shortcut icon linked to a specified path or having a predefined executable code. According to various embodiments of the present disclosure, a widget refers to a mini application being useable by a user through an input unit.

FIG. 1A is a perspective view illustrating the front side of a portable device according to an embodiment of the present disclosure. Additionally, FIG. 1B is a perspective view illustrating the rear side of a portable device according to an embodiment of the present disclosure.

Referring to FIGS. 1A and 1B, the portable device 100 has a touch screen 190 which is disposed at the front side 100a. In the case of FIG. 1A, a home screen 191 is displayed on the touch screen 190. The portable device 100 may have a plurality of different home screens. In the home screen 191, shortcut icons 191a to 191h, respectively corresponding to applications being selectable by a touch, may be displayed together with some widgets (not shown). Additionally, at an upper part of the home screen 191, a status bar (not shown) that indicates a status of the portable device 100 such as a battery charging state, received signal strength, a current time, etc., may be displayed. The portable device 100 may display both the home screen 191 and the status bar or display the home screen 191 alone without displaying the status bar.

Figure 2A:
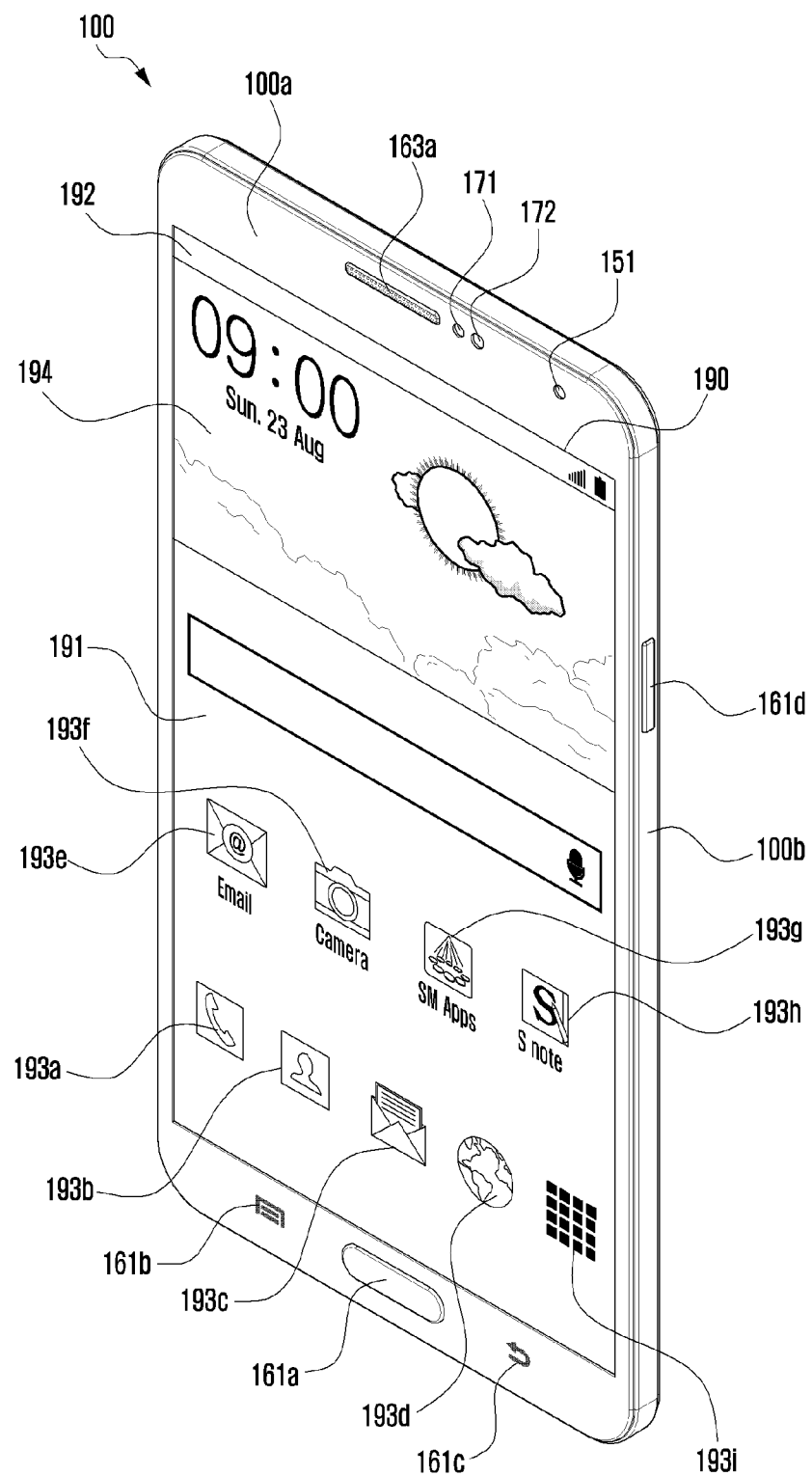
FIG. 2A is a perspective view illustrating the front side of a portable device according to an embodiment of the present disclosure.

The front side 100a of the portable device 100 may have, at an upper part thereof, a first camera 151, two or more speakers 163a (and 163b in FIG. 2B), an illuminance sensor 171, and a proximity sensor (172 in FIG. 2A). The rear side 100c of the portable device 100 may have the second camera 152 and a flash 153.

Further, the front side 100a of the portable device 100 may have, at a lower part thereof, a home button 161a, a menu button 161b, and a back button 161c. These buttons 161a, 161b and 161c may be formed of a touch button instead of a physical button. Alternatively, these buttons may be displayed on the touch screen 190, together with text or other icon.

The lateral side 100b of the portable device 100 may have a power/lock button 161d, a volume button 161e, etc. at an upper part thereof, and further have one or more microphones 162, a connector 165, etc. at a lower part thereof. Also, the upper part of the portable device 100 may have an insertion hole for receiving an input unit 166 having a button 166a. The input unit 166 may be kept in the portable device 100 through the insertion hole and, for use, drawn out from the portable device 100.

FIG. 2A is a perspective view illustrating the front side of a portable device according to an embodiment of the present disclosure. Also, FIG. 2B is a perspective view illustrating the rear side of a portable device according to an embodiment of the present disclosure.

Figure 2B:
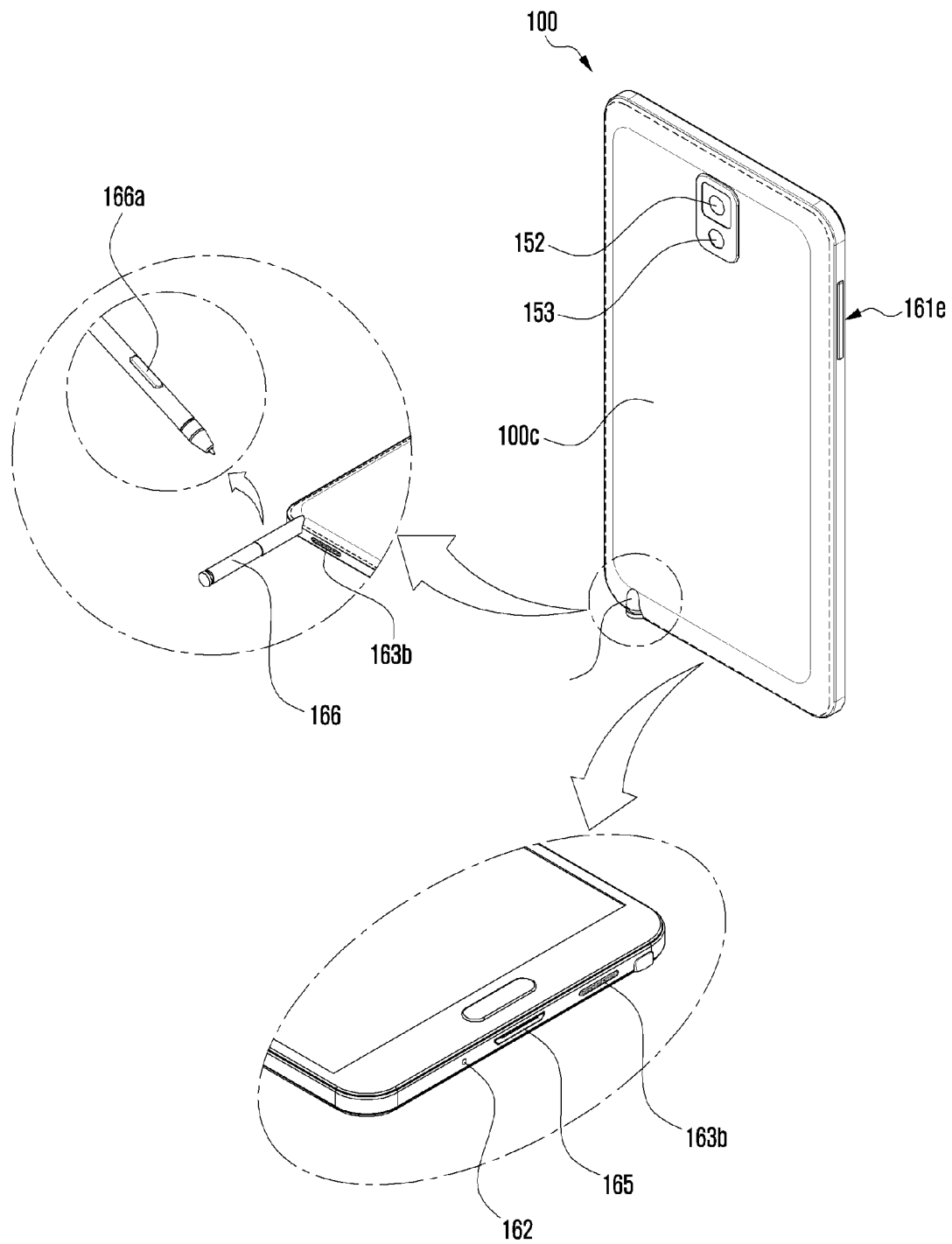
FIG. 2B is a perspective view illustrating the rear side of a portable device according to an embodiment of the present disclosure.

Referring to FIGS. 2A and 2B, the portable device 100 has a touch screen 190 which is disposed at the front side 100a. In FIG. 2A, a home screen 191 is displayed on the touch screen 190 in response to a user's log-in. The portable device 100 may have a plurality of different home screens. In the home screen 191, shortcut icons 193a to 193h for executing frequently used applications, a menu icon 193i for displaying a menu of the portable device 100, and a time/weather widget 194 may be displayed. Additionally, at an upper part of the home screen 191, a status bar 192 that indicates a status of the portable device 100 such as a battery charging state, received signal strength, a current time, etc., may be displayed. This status bar may be not displayed on the home screen 191.

The front side 100a of the portable device 100 may have, at a lower part thereof, a home button 161a, a menu button 161b, and a back button 161c. These buttons 161a, 161b and 161c may be formed of a touch button instead of a physical button. Alternatively, these buttons may be displayed on the touch screen 190.

Further, the front side 100a of the portable device 100 may have, at an upper part thereof, a first camera 151, an illuminance sensor 171, and a proximity sensor 172. The rear side 100c of the portable device 100 may have the second camera 152, a flash 153, and a speaker (not shown).

The lateral side 100b of the portable device 100 may have, for example, a power/lock button 161d, a volume button 161e, and one or more microphones 162.

The lateral side of the portable device 100 may also have a connector 165 at a lower part thereof. The connector 165 has electrodes for a wired connection with any external device. Also, the lower part of the portable device 100 may have an insertion hole for receiving an input unit 166 having a button 166a. The input unit 166 may be kept in the portable device 100 through the insertion hole and, for use, drawn out from the portable device 100.

Figure 3A:
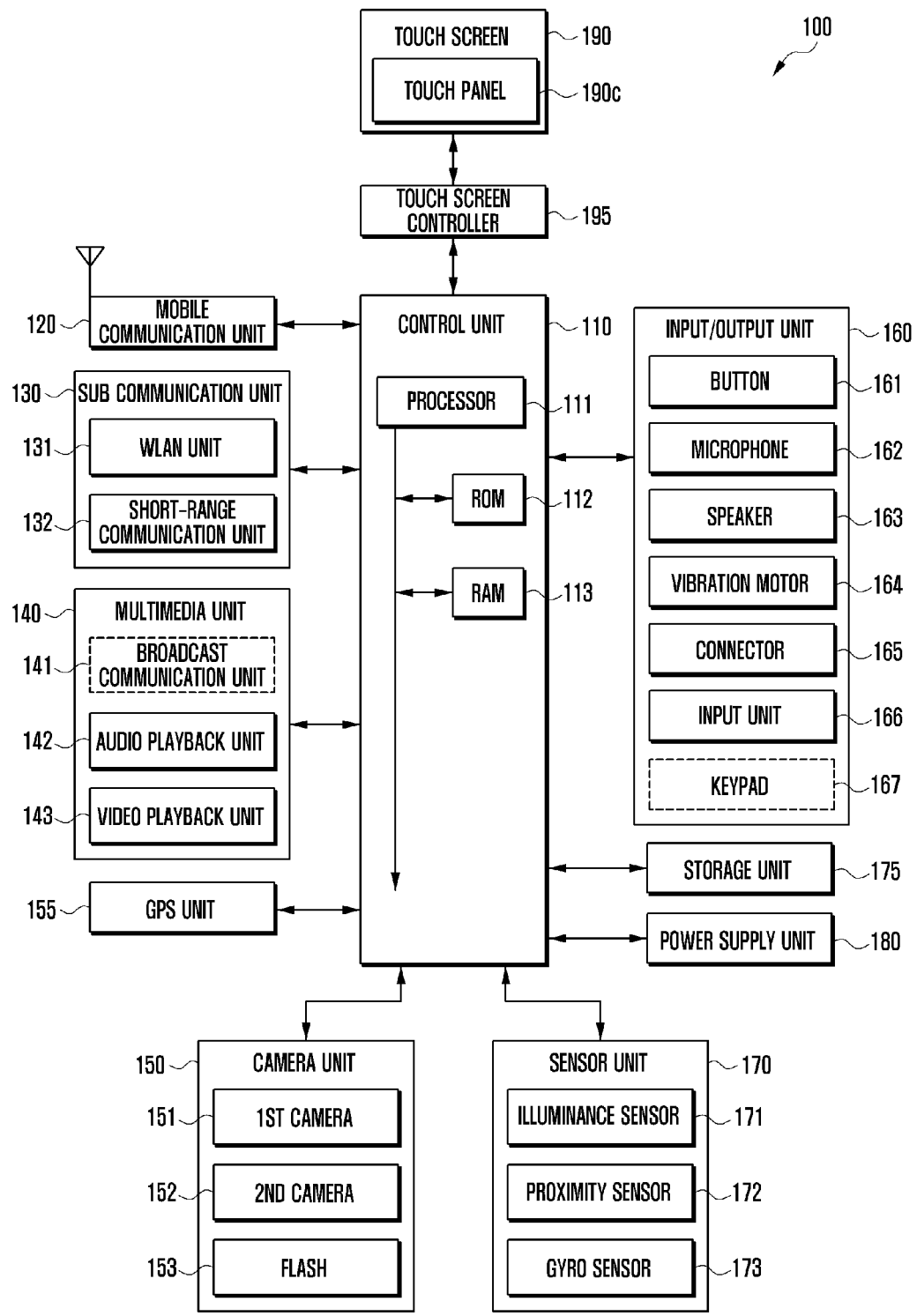
FIG. 3A is a block diagram illustrating a portable device according to an embodiment of the present disclosure.

FIG. 3A is a block diagram illustrating a portable device according to an embodiment of the present disclosure.

Referring to FIG. 3A, the portable device 100 may be connected with an external device (not shown), using a mobile communication unit 120, a sub communication unit 130, and/or a connector 165. A connectable external device may include another portable device, a mobile phone, a smart phone, a tablet Personal Computer (PC), an interactive white board, a server, etc. The portable device 100 has an input unit and/or a touch screen, and can transmit or receive data through a communication unit. The portable device 100 may have one or more touch screens. For example, the portable device 100 may include an MP3 player, a video player, a tablet PC, a Three Dimensional Television (3D TV), a smart TV, a Light Emitting Diode (LED) TV, a Liquid Crystal Display (LCD) TV, or the like. Also, the portable device 100 may include a device capable of transmitting or receiving data to or from a connectable external device through any interaction (e.g., a touch, a gesture, etc.) inputted at the input unit and/or the touch screen.

The portable device 100 includes a touch screen 190 and a touch screen controller 195. In an embodiment, the touch screen may include one or more touch screen panels, here shown as 190c. Also, the portable device 100 includes a control unit 110, the mobile communication unit 120, the sub communication unit 130, a multimedia unit 140, a camera unit 150, a Global Positioning System (GPS) unit 155, an input/output unit 160, a sensor unit 170, a storage unit 175, and a power supply unit 180.

The sub communication unit 130 includes at least one of a wireless Local Area Network (LAN) unit 131 and a short-range communication unit 132. The multimedia unit 140 includes at least one of a broadcast communication unit 141, an audio playback unit 142, and a video playback unit 143. The camera unit 150 includes at least one of the first camera 151 and the second camera 152. The input/output unit 160 includes at least one of a button 161, a microphone 162, a speaker 163, a vibration motor 164, the connector 165, an input unit 166, and a keypad 167. The sensor unit 170 includes an illuminance sensor 171, a proximity sensor 172, and/or a gyro sensor 173.

The control unit 110 includes a processor 111, a Read-Only Memory (ROM) 112 storing therein a control program for the control of the portable device 100, and a Random Access Memory (RAM) 113 used as a storage region for various operations performed in the portable device 100.

The control unit 110 controls an overall operation of the portable device 100 and a signal flow between respective internal elements 120 to 195 in the portable device 100, and performs a data processing function. Also, the control unit 110 controls the supply of power from the power supply unit 180 to respective internal elements 120 to 195. Furthermore, when a user's input is received or when a predefined condition is satisfied, the control unit 110 may execute an OS and various applications stored in the storage unit 175.

The processor 111 may include a Graphic Processing Unit (GPU, not shown) for a graphic processing. The processor 111 may be formed of a single System on Chip (SoC) into which a core (not shown) and the GPU (not shown) are integrated. The processor 111 may include a single core, a dual core, a triple core, a quad core, and the like. The processor 111, the ROM 112 and the RAM 113 are connected with each other through an internal bus.

The control unit 110 may control the mobile communication unit 120, the sub communication unit 130, the multimedia unit 140, the camera unit 150, the GPS unit 155, the input/output unit 160, the sensor unit 170, the storage unit 175, the power supply unit 180, the touch screen 190, and the touch screen controller 195.

According to an embodiment of the present disclosure, the control unit 110 may detect an ambient illuminance around the portable device. If the detected ambient illuminance is less than a threshold value, the control unit 110 may calculate the first distance between the illuminance sensor and a touch of the input unit detected from the touch screen, and also calculate the second distance between the illuminance sensor and a user's direct touch detected from the touch screen. If the first distance is equal to or greater than the second distance, the control unit 110 may control the touch screen to maintain the current screen brightness thereof.

In case a screen brightness auto mode is activated, the control unit 110 may inactivate the screen brightness auto mode when maintaining the current brightness.

The control unit 110 may change the threshold value, depending on the detected ambient illuminance.

The control unit 110 may determine the threshold value by multiplying a constant by the maximum illuminance detected at the portable device.

The control unit 110 may detect the touch of the input unit as a single point touch.

The control unit 110 may detect the user's direct touch as a multi point touch which has a plurality of single point touches.

In case a user holds the input unit, the control unit 110 may detect a touch caused by contact between the touch screen and a user's hand blade or a touch caused by contact between the touch screen and a user's palm heel.

The control unit 110 may maintain the screen brightness for a time defined according to an illuminance detection cycle of the illuminance sensor.

In response to the maintenance of the current screen brightness, the control unit 110 may offer at least one of a visual feedback, an audible feedback, a tactile feedback, etc.

According to an embodiment of the present disclosure, the control unit 110 may detect an ambient illuminance around the portable device. If the detected ambient illuminance is less than a threshold value, the control unit 110 may detect a touch of the input unit from the outside of a determination region defined on a touch screen, detect a user's direct touch from the determination region, and maintain the current screen brightness in response to the detection of such touches.

In a portable device having the screen brightness auto mode activated, the control unit 110 may inactivate the screen brightness auto mode in response to the maintenance of the current screen brightness.

The control unit 110 may detect the touch of the input unit as a single point touch, and also detect the user's direct touch as a multi point touch.

The control unit 110 may control a threshold value to have one of a dynamic threshold value changed depending on the detected ambient illuminance and a static threshold value determined by multiplying a constant by the maximum illuminance detected at the portable device.

The control unit 110 may change at least one of a shape, size a location, etc. of the determination region.

In various embodiments of the present disclosure, the term "control unit" is considered as including therein the processor 111, the ROM 112, and the RAM 113.

The mobile communication unit 120 may be connected with any external device through a mobile communication, using one or more antennas under the control of the control unit 110. The mobile communication unit 120 transmits or receives a radio signal for a voice call, a video call, a Short Messaging Service (SMS), a Multimedia Messaging Service (MMS), or a data communication to or from a mobile phone, a smart phone, a tablet PC, or another portable device which is in a state being connectible with the portable device 100.

The sub communication unit 130 may include therein at least one of the wireless LAN unit 131 and the short-range communication unit 132. Namely, the sub communication unit 130 may include either or both of the wireless LAN unit 131 and the short-range communication unit 132.

The wireless LAN unit 131 may be wirelessly connected with an Access Point (AP) under the control of the control unit 110. The wireless LAN unit 131 supports a relevant communication standard such as the Institute of Electrical and Electronics Engineers (IEEE) 802.11x standard. Without any AP, the short-range communication unit 132 may allow a short-range communication between the portable device 100 and an external device under the control of the control unit 110. A short-range communication may include, but not limited to, Bluetooth, Bluetooth Low Energy (LE), Infrared Data Association (IrDA), Wireless Fidelity (Wi-Fi), Ultra WideBand (UWB), and Near Field Communication (NFC).

Depending on the capability thereof, the portable device 100 may include therein at least one of the mobile communication unit 120, the wireless LAN unit 131, and the short-range communication unit 132. For example, the portable device 100 may include only one of the mobile communication unit 120, the wireless LAN unit 131, and the short-range communication unit 132, or any combination thereof.

In various embodiments of the present disclosure, the term "communication unit" is considered as including therein the mobile communication unit 120 and the sub communication unit 130.

The multimedia unit 140 may include therein the broadcast communication unit 141, the audio playback unit 142, and/or the video playback unit 143. The broadcast communication unit 141 may receive a broadcast signal (e.g., TV broadcast signal, a radio broadcast signal, or a data broadcast signal) and any additional information (e.g., Electronic Program Guide (EPG) or Electronic Service Guide (ESG)) from a broadcasting station through a suitable antenna under the control of the control unit 110. Then, the control unit 110 may output the received broadcast signal and additional information, using the touch screen, a video codec unit (not shown), and an audio codec unit (not shown).

The audio playback unit 142 may play an audio source (e.g., an audio file having the filename extension 'mp3', 'wma', 'ogg' or 'way') stored in the storage unit 175 or received from any external entity, using an audio codec unit under the control of the control unit 110.

In various embodiments of the present disclosure, the audio playback unit 142 may output an audible feedback (e.g., the output of an audio source stored in the storage unit), corresponding to a touch or a continuous movement of a touch detected from the touch screen 190, through the audio codec unit under the control of the control unit 110.

The video playback unit 143 may play a video source (e.g., a video file having the filename extension 'mpeg', 'mpg', 'mp4', 'avi', 'mov' or 'wkv') stored in the storage unit 175 or received from any external entity, using a video codec unit under the control of the control unit 110. Most applications which are installable at the portable device 100 may play an audio source or a video file, using the audio codec unit or the video codec unit.

In various embodiments of the present disclosure, the video playback unit 143 may output a visual feedback (e.g., the output of a video source stored in the storage unit), corresponding to the inactivation of the screen brightness auto mode, through the video codec unit under the control of the control unit 110.

Various types of video and audio codec units, which are commercially available, may be selectively and favorably used for this disclosure as well understood by those skilled in the art.

Depending on the capability or structure of the portable device 100, the multimedia unit 140 may have only the audio playback unit 142 and the video playback unit 143 except the broadcast communication unit 141. In some cases, the audio playback unit 142 and the video playback unit 143 of the multimedia unit 140 may be included in the control unit 110.

In various embodiments of the present disclosure, the term "audio codec unit" is considered as including therein one or more audio codec units. Similarly, the term "video codec unit" is considered as including therein one or more video codec units.

The camera unit 150 may include therein at least one of the first camera 151 (as also shown in FIG. 1A) disposed at the front side (e.g., 100a in FIG. 1A) and the second camera 152 (as also shown in FIG. 1B) disposed at the rear side (e.g., 100c in FIG. 1B). Namely, the camera unit 150 may be formed of either or both of the first and second cameras 151 and 152. The first camera 151 and/or the second camera 152 may have therein or be functionally connected with an auxiliary light source (e.g., the flash 153 as also shown in FIG. 1B) that offers a sufficient quantity of light.

If there is an additional camera (i.e., the third camera, not shown) at the front side and if the additional camera is adjacent to the first camera 151 (e.g., 20~80 mm distant from the first camera 151), the first camera 151 and the additional camera may be used together to create three-dimensional image or video. Similarly, if there is an additional camera (i.e., the fourth camera, not shown) at the rear side and if this additional camera is adjacent to the second camera 152 (e.g., 20~80 mm distant from the second camera 152), the second camera 152 and the additional camera may be used together to create three-dimensional image or video. Meanwhile, using a separate adapter (not shown), each camera 151 or 152 may perform a wide-angle, telescopic, and/or close-up shooting.

The GPS unit 155 periodically receives, from GPS satellites in earth orbit, various information (e.g., information about their locations, a current time, etc.). Using such information, the portable device 100 can calculate a current position and speed thereof.

The input/output unit 160 may include therein at least one of the button 161, the microphone 162, the speaker 163, the vibration motor 164, the connector 165, the input unit 166, and the keypad 167.

As also shown in FIGS. 1A to 2B, the button 161 includes the home button 161a, the menu button 161b, and the back button 161c, which are disposed at a lower part of the front side 100a. Further, the button 161 may include the power/lock button 161d and the volume button 161e, which are disposed at the lateral side 100b. In some cases, the button 161 of the portable device 100 may have the home button 161a only. The button 161 may be formed of a touch button, disposed along a bezel of the touch screen 190, as well as a physical button. Alternatively, the button 161 may be displayed on the touch screen 190 in the form of text, image, or icon.

The microphone 162 receives a voice or sound from the outside and creates an electric signal under the control of the control unit 110. This electric signal may be converted at the audio codec unit and then stored in the storage unit 175 or outputted through the speaker 163. The microphone 162 may be installed at one or more places of the front, lateral, and/or rear sides of the portable device 100. In some cases, the microphone 162 may be installed at one or more places of only the lateral side of the portable device 100.

The speaker 163 may output sounds corresponding to various signals (e.g., a radio signal, a broadcast signal, an audio source, a video file, or a shutter sound) of the mobile communication unit 120, the sub communication unit 130, the multimedia unit 140, or the camera unit 150, using the audio codec unit under the control of the control unit 110.

The speaker 163 may output a sound (e.g., a touch input sound) caused by the execution of a function in the portable device 100. The speaker 163 may be installed at one or more places of the front, lateral, and/or rear sides of the portable device 100. For example, in FIGS. 2A and 2B, the first speaker 163a is formed at the front side 100a of the electronic device 100, and the second speaker 163b is formed at the lateral side 100b of the electronic device 100. In alternative cases, two or more speakers may be disposed together at the front side only, or disposed respectively at the front and rear sides.

Additionally, such a speaker may be disposed at each lateral side. The electronic device 100 having such lateral speakers may offer different sound effects from other electronic device having no lateral speaker.

In various embodiments of the present disclosure, the speaker 163 may output an audible feedback in response to the detected illuminance, a touch of the input unit 166 detected from the touch screen 190, and a user touch under the control of the control unit 110.

The vibration motor 164 may convert an electric signal into a mechanical vibration under the control of the control unit 110. The vibration motor 164 may employ a linear vibration motor, a bar-type vibration motor, a coin-type vibration motor, or a piezoelectric vibration motor. For example, when a request for a voice call is received from other portable device, and if the portable device 100 is in a vibration mode, the vibration motor 164 starts to operate under the control of the control unit 110. In some cases, two or more vibration motors may be used. Also, the vibration motor 164 may vibrate the entire portable device 100 or vibrate a part of the portable device 100.

In various embodiments of the present disclosure, the vibration motor 164 may output a tactile feedback in response to the detected illuminance, a touch of the input unit 166 detected from the touch screen 190, and a user touch under the control of the control unit 110. Also, the vibration motor 164 may output various tactile feedbacks (e.g., various types of vibration strength and duration) according to a control command stored in the storage unit or received from the outside.

The connector 165 may be used as an interface for connecting the portable device 100 with any external device (not shown) or a power source (not shown). Through a wire cable coupled to the connector 165 and under the control of the control unit 110, the portable device 100 may transmit data stored in the storage unit 175 to an external device or receive data from an external device. Further, through a wire cable coupled to the connector 165, the portable device 100 may receive electric power from a power source or recharge a battery (not shown) equipped therein. Also, the portable device 100 may be connected with any external accessory (e.g., a keyboard dock) through the connector 165.

The input unit 166 may touch or select an object (e.g., menu, text, image, video, figure, icon, shortcut icon, etc.) displayed on the home screen 191, a screen (e.g., a note page screen, a canvas screen, etc.) of a handwriting/drawing application, or any other screen on the touch screen 190. Additionally, the input unit 166 may touch or select desired one of contents (e.g., a text file, an image file, an audio file, a video file, a personalized item, etc.) displayed on such various screens. Further, the input unit 166 may perform handwriting, drawing, painting, or sketching on the note page screen of the handwriting application, the canvas screen of the drawing application, and the like.

The input unit 166 may enter characters, letters, symbols, commands, etc. in the portable device 100, using a virtual keypad displayed on the touch screen or touching objects displayed on the touch screen. The touch screen may be formed of a capacitive type, a resistive type, an electromagnetic resonance type, or the like. The input unit 166 may be a stylus pen or a haptic pen in which a vibratory component (e.g., an actuator or a vibration motor) is embedded. In case of the latter input unit 166, the vibratory component may vibrate in response to control information received from the portable device 100 or sensing information detected from a sensor (e.g., an acceleration sensor) embedded in the input unit 166.

When the input unit 166 is drawn out from the insertion hole, the control unit 110 may execute a predefined handwriting/drawing application and display an associated screen on the touch screen 190.

Sometimes the input unit 166 may be a user's finger (including thumb). In this case, a user may perform handwriting or drawing with his or her finger in a relevant application displayed on the touch screen (e.g., a capacitive type or a resistive type).

Further, in this case, the control unit 110 may detect a finger's touch through the touch screen 190 and the touch screen controller 195.

The shape and structure of the insertion hole and the input unit 166 may be varied according to the capability or structure of the portable device 100 as well understood by those skilled in the art.

The keypad 167 may receive a user's key input for manipulating the portable device 100. The keypad 167 includes a physical keypad (not shown) formed at the front side of the portable device 100, a virtual keypad (not shown) displayed on the touch screen 190, and/or any other physical keypad (not shown) connectible wirelessly. As understood by those skilled in the art, a certain type of the portable device 100 may have no physical keypad.

The sensor unit 170 includes at least one sensor for detecting the status of the portable device 100. For example, the sensor unit 170 may include the illuminance sensor 171 for detecting the quantity of light around the portable device 100, the proximity sensor 172 for detecting the approach of something (e.g., a user), and the gyro sensor 173 for detecting the direction of the portable device 100. Further, the sensor unit 170 may selectively include an acceleration sensor (not shown) for detecting the gradient on three axes (e.g., x-axis, y-axis and z-axis) applied to the portable device 100, a gravity sensor (not shown) for detecting the direction of gravity, an altimeter (not shown) for detecting the altitude, etc.

The sensor unit 170 may measure the acceleration of motion and the acceleration of gravity of the portable device 100. In case the portable device 100 remains stationary, the sensor unit 170 may measure only the acceleration of gravity. For example, the acceleration of gravity may be positive when the front side of the portable device 100 faces upward, and the acceleration of gravity may be negative when the front side of the portable device 100 faces downward.

At least one sensor included in the sensor unit 170 detects the status of the portable device 100, creates a detection signal, and transmits it to the control unit 110. As well understood by those skilled in the art, the above-discussed sensors may be selectively included in or excluded from the portable device 100.

The storage unit 175 may store therein, under the control of the control unit 110, a signal or data inputted or outputted in connection with operations of the mobile communication unit 120, the sub communication unit 130, the multimedia unit 140, the camera unit 150, the GPS unit 155, the input/output unit 160, the sensor unit 170, and the touch screen 190. Also, the storage unit 175 may store therein various control programs to be used by the control unit 110, various types of GUI associated with applications offered by a manufacturer or downloaded from any external entity, images used for offering GUI, user information, documents, database, or related data.

In various embodiments of the present disclosure, the storage unit 175 may store therein setting information of a screen brightness auto mode.

The storage unit 175 may store therein illuminance information that indicates an ambient illuminance detected through the illuminance sensor 171.

The storage unit 175 may store therein a threshold value to be used for comparison with the detected ambient illuminance. Also, the storage unit 175 may store therein a dynamic threshold value or a static threshold value. And also, for managing a history of a dynamic threshold value, the storage unit 175 may store therein illuminance information previously detected.

The storage unit 175 may store therein location information of a touch of the input unit, location information of a user's touch (e.g., X and Y coordinates of a detected touch, a touch duration, etc.), and/or hovering information (e.g., X and Y coordinates of a hovering, a hovering duration, etc.). The storage unit 175 may also store therein a type of a continuous touch movement by the input unit (e.g., handwriting, drawing, etc.).

The storage unit 175 may store therein shape information (e.g., a semicircle, a quadrangle, etc.), size information (e.g., a radius of 30 mm), and location information (e.g., an intersection point) of a determination region.

The storage unit 175 may store therein a predetermined time (e.g., 30 sec) corresponding to the maintenance of screen brightness.

As a response to the maintenance of screen brightness, the storage unit 175 may store therein a visual feedback (e.g., a video source, etc.) to be outputted through the touch screen 190, an audible feedback (e.g., a sound source, etc.) to be outputted though the speaker 163, and/or a tactile feedback (e.g., a haptic pattern, etc.) to be outputted through the vibration motor 164.

The storage unit 175 may store therein a feedback offering time (e.g., 500 msec) of a feedback to be offered to a user.

In various embodiments of the present disclosure, the term "storage unit" may be considered as including therein the storage unit 175, the ROM 112 and the RAM 113 in the control unit 110, and a memory card (not shown, e.g., micro secure digital (SD) card, a memory stick, etc.) mounted in the portable device 100. The storage unit may include a nonvolatile memory, a volatile memory, a hard disk drive (HDD), a solid state drive (SSD), or the like.

The power supply unit 180 may supply electric power to one or more batteries (not shown) equipped in the portable device 100 under the control of the control unit 110. Such a battery may be separated from the portable device 100. The power supply unit 180 may supply electric power from any external power source (not shown) to the portable device 100 through a wire cable (not shown) coupled to the connector 165. Additionally, the power supply unit 180 may perform a wireless charging process (e.g., a magnetic resonance type, an electromagnetic type, or a magnetic induction type) under the control of the control unit 110.

The touch screen 190 may offer various kinds of GUI corresponding to various services (e.g., a voice call, a video call, a data transmission, a broadcast reception, a photo capture, a video play, or an application execution). The touch screen 190 transmits a single touch signal or a multi touch signal, received through the home screen 191 or GUI, to the touch screen controller 195. The touch screen 190 may receive a single touch or a multi touch from the input unit 166 or user's body (e.g., finger).

In various embodiments of the present disclosure, a touch may be considered as including non-contact (e.g., a hovering gesture having a distance of 50 mm or less between the touch screen 190 and the input unit 166 or a user's body) as well as contact between the touch screen 190 and the input unit 166 or a user's body. As well understood by those skilled in the art, a distance of detectable non-contact may be varied according to the capability or structure of the portable device 100.

The touch screen 190 may be formed of, for example, a resistive type, a capacitive type, an infrared type, an acoustic wave type, or an electromagnetic resonance type.

The touch screen controller 195 receives an analog signal corresponding to a single touch or a multi touch from the touch screen 190, converts the received analog signal into a digital signal (e.g., X and Y coordinates corresponding to the detected touch point), and transmits the digital signal to the control unit 110. Alternatively, using a signal received from the touch screen controller 195, the control unit 110 may calculate the X and Y coordinates indicating a touch point on the touch screen 190.

The control unit 110 may control the touch screen 190, using the digital signal received from the touch screen controller 195. For example, in response to a touch, the control unit 110 may highlight a selected shortcut icon (e.g., 191a in FIG. 1A) to be distinguished from the others (e.g., 191b to 191h in FIG. 1A), or execute a particular application (e.g., S Note) linked to a selected shortcut icon (e.g., 191a in FIG. 1A).

The touch screen controller 195 may have one or more controllers. Also, depending on the capability or structure of the portable device 100, the touch screen controller 195 may be included in the control unit 110.

The above-discussed elements of the portable device 100, as shown in FIG. 3A, may be selectively added to or removed from the portable device 100 or modified or replaced on the basis of capability, structure, etc. of the portable device 100, as well understood by those skilled in the art.

Figure 3B:
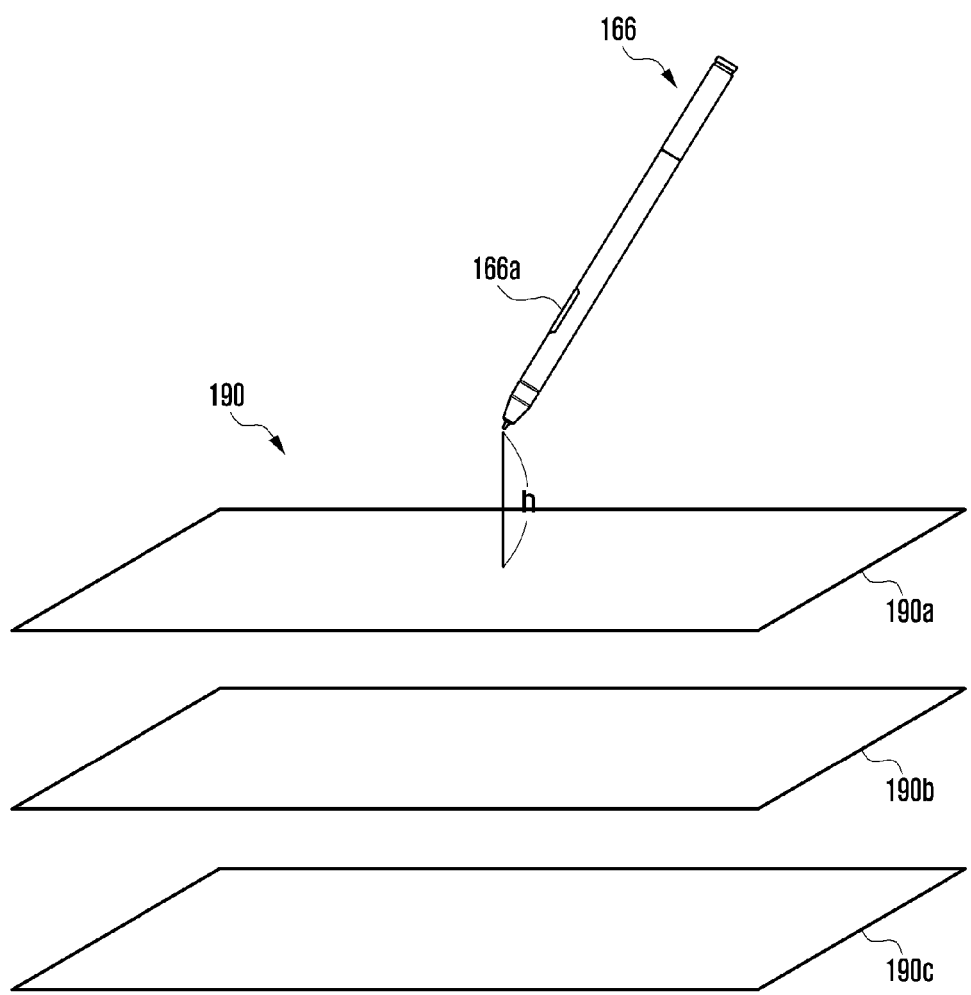
FIG. 3B is a schematic diagram illustrating an internal structure of a touch screen according to an embodiment of the present disclosure.

FIG. 3B is a schematic diagram illustrating an internal structure of a touch screen according to an embodiment of the present disclosure.

Referring to FIG. 3B, the touch screen 190 has a layered structure of a first touch panel 190a for detecting a touch input of the input unit 166 or a user's finger, a display panel 190b for displaying a screen, and the second touch panel 190c for detecting an input of the input unit 166 in order from the top. In another embodiment of the present disclosure, the first touch panel 190a may be located under the display panel 190b.

The first touch panel 190a may be formed of a capacitive type which has a glass plate coated with conductive material (e.g., Indium Tin Oxide (ITO) film, etc.). When the input unit 166 or a user's finger is in contact with the first touch panel 190a, the movement of charges happens and the first touch panel 190a detects a touch point by sensing a change in an electric current caused by the movement of charges.

The display panel 190b has a large number of pixels and displays thereon an image through pixels. For example, the display panel 190b may be formed of an LCD, an Organic Light Emitting Diode (OLED), an Active Matrix OLED (AMOLED), or the like. The display panel 190b shows thereon a current status of the portable device 100 and also visually offers various images and objects in response to the execution of a selected application or service.

The second touch panel 190c may be formed of an electromagnetic resonance (EMR) type which has an electromagnetic sensor and a signal processing unit. The electromagnetic sensor has a grid structure of a plurality of loop coils which are arranged crosswise in the first and second directions. The signal processing unit sequentially offers an alternating current having a given frequency to the respective loop coils. When the input unit 166 having a resonance circuit is approaching a loop coil of the second touch panel 190c, a magnetic field created from the loop coil generates an electric current at the resonance circuit of the input unit 166 by electromagnetic induction. Then, an induced magnetic field is generated at the resonance circuit of the input unit 166, and hence the second touch panel 190c can detect the induced magnetic field from the loop coil. Therefore, using the above, the control unit 110 may calculate a hovering location of the input unit 166, a touch location, and/or a hovering height (e.g., 50 mm) from the touch screen 190 to a pen tip of the input unit 166.

A detectable hovering height (h) from the touch screen 190 to a pen tip of the input unit 166 may be varied according to the capability or structure of the portable device 100 as well understood by those skilled in the art.

The second touch panel 190c may be used only for detecting a hovering or touch by the input unit 166 of EMR type. Therefore, the second touch panel 190c may also be referred to as an input unit sensing panel or an EMR type input unit sensing panel. The input unit 166 may also be referred to as an electromagnetic pen or an EMR pen. The input unit 166 may be different from another type pen having no resonance circuit and detected through the first touch panel 190a. The input unit 166 may have a button (e.g., 166a in FIG. 2B) capable of changing an electromagnetic induction value caused by a coil located at a region adjacent to the pen tip.

The touch screen controller 195 may include the first touch panel controller (not shown) corresponding to the first touch panel 190a and the second touch panel controller (not shown) corresponding to the second touch panel 190c. The first touch panel controller may receive an analog signal created by a touch of the input unit 166 or a user's finger from the first touch panel 190a, convert the received analog signal into a digital signal (e.g., X and Y coordinates), and transmit it to the control unit 110. The second touch panel controller may receive an analog signal created by a hovering or touch of the input unit 166 from the second touch panel 190c, convert the received analog signal into a digital signal (e.g., X, Y and Z coordinates), and transmit it to the control unit 110.

Using digital signals received from the first and second touch panel controllers, the control unit 110 may control the first touch panel 190a, the display panel 190b, and the second touch panel 190c. Then, the control unit 110 may display a suitable screen on the display panel 190b in response to a user's touch or a touch or hovering of the input unit 166. Meanwhile, the touch screen controller 195 alone may control the first and second touch panels 190a and 190c.

In various embodiments of the present disclosure, the term "touch screen controller" may be considered as including the touch screen controller 175, the first touch panel controller (not shown), or the second touch panel controller (not shown).

In various embodiments of the present disclosure, the control unit 110 of the portable device 100 may distinctively detect a touch and/or hovering by the input unit 166 or by a user's finger. Although FIGS. 3A and 3B show the portable device 100 having a single touch screen, this is only an example. Alternatively, two or more touch screens may be used for the portable device 100. In this case, each touch screen may be located in housing and interconnected by a hinge, or all touch screens may be disposed in a single flexible housing. Each touch screen may be formed of the display panel and two or more touch panels as shown in FIG. 3B.

Figure 4:
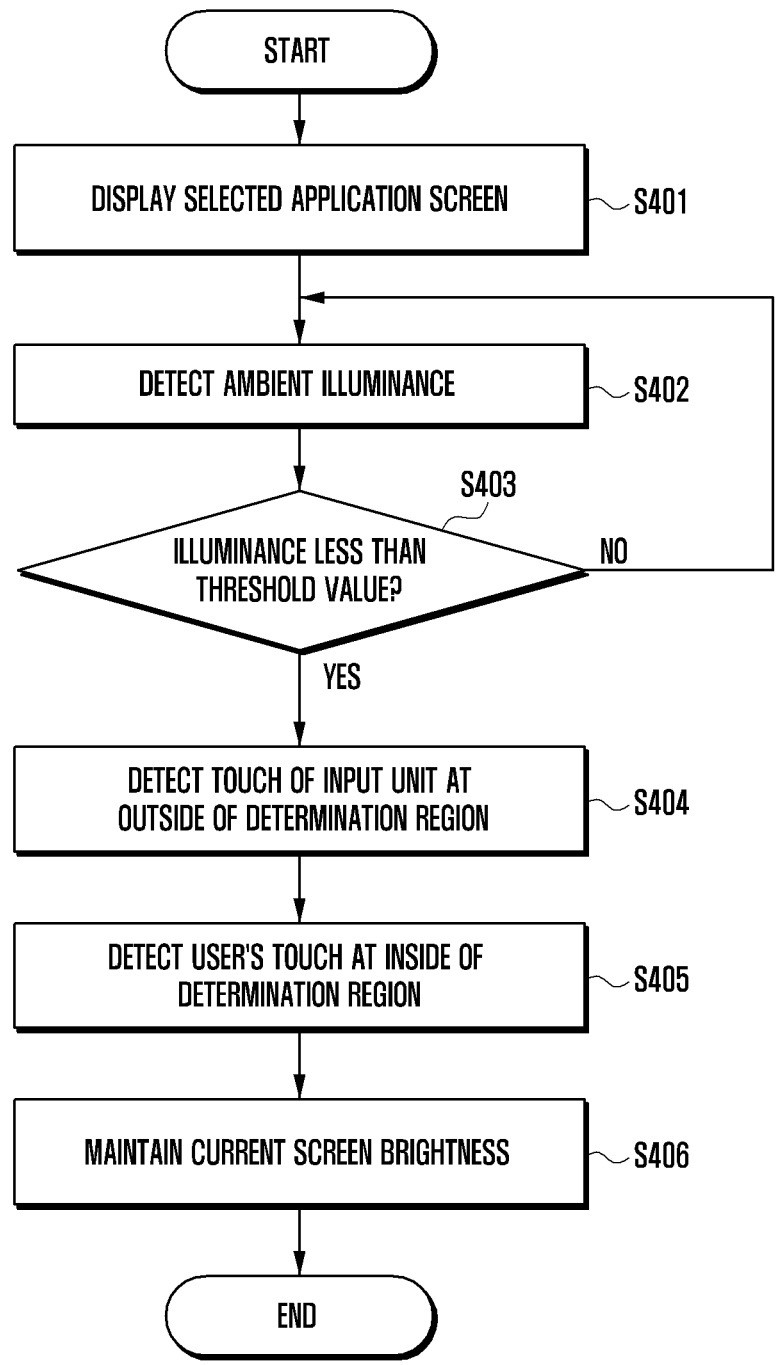
FIG. 4 is a flow diagram illustrating a method for controlling the screen brightness of a portable device according to an embodiment of the present disclosure.

FIG. 4 is a flow diagram illustrating a method for controlling the screen brightness of a portable device according to an embodiment of the present disclosure. Additionally, FIGS. 5A to 5D are diagrams illustrating a method for controlling the screen brightness of a portable device according to an embodiment of the present disclosure.

Referring to FIG. 4, the portable device 100 displays an application screen on the touch screen 190 at operation S401.

Figure 5A:
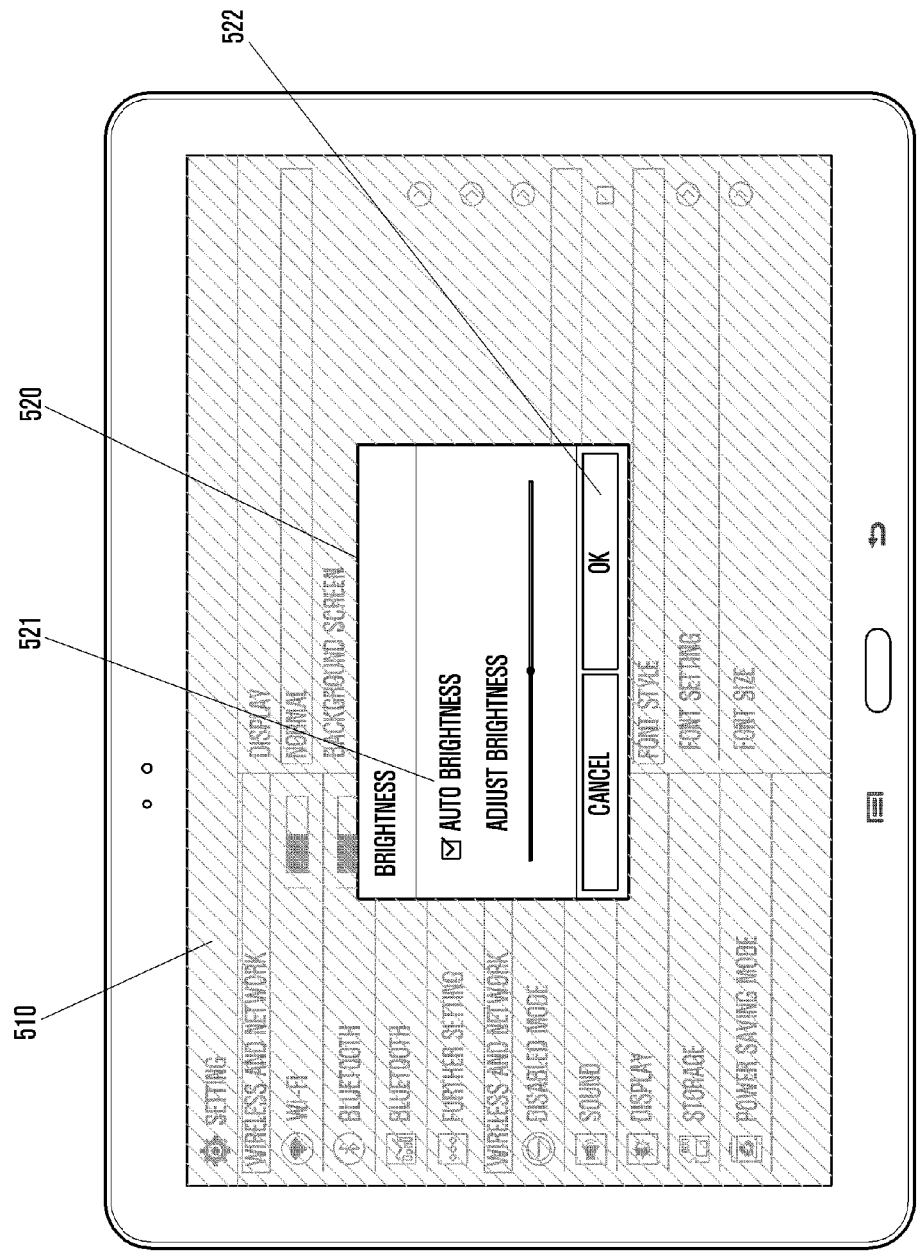

Referring to FIG. 5A, a popup window 520 for adjusting the screen brightness is displayed on a setting page 510. Specifically, when a user input (e.g., selecting a shortcut icon linked to a setting menu) is received, the control unit 110 displays the setting page 510 on the touch screen 190. Then, the control unit 110 displays the popup window 520 in response to a predefined user input (e.g., selecting a display menu for adjusting the screen brightness). When an auto brightness item 521 is selected and an OK button 522 is pressed in the popup window 520, the control unit 110 activates the screen brightness auto mode for automatically adjusting the screen brightness of the portable device 100 depending on an ambient illuminance. The control unit 110 may store this setting information in the storage unit 175. The setting information about the screen brightness auto mode may contain identification (ID), a setting time, etc. for a history management.

In case the screen brightness auto mode is activated, the portable device 100 may increase the screen brightness of the touch screen 190 when an ambient illuminance detected through the illuminance sensor 171 increases. Additionally, the portable device 100 may decrease the screen brightness of the touch screen 190 when an ambient illuminance decreases. Namely, in the screen brightness auto mode, the screen brightness of the touch screen 190 may be adjusted automatically, depending on an ambient illuminance around the portable device 100.

Figure 5B:
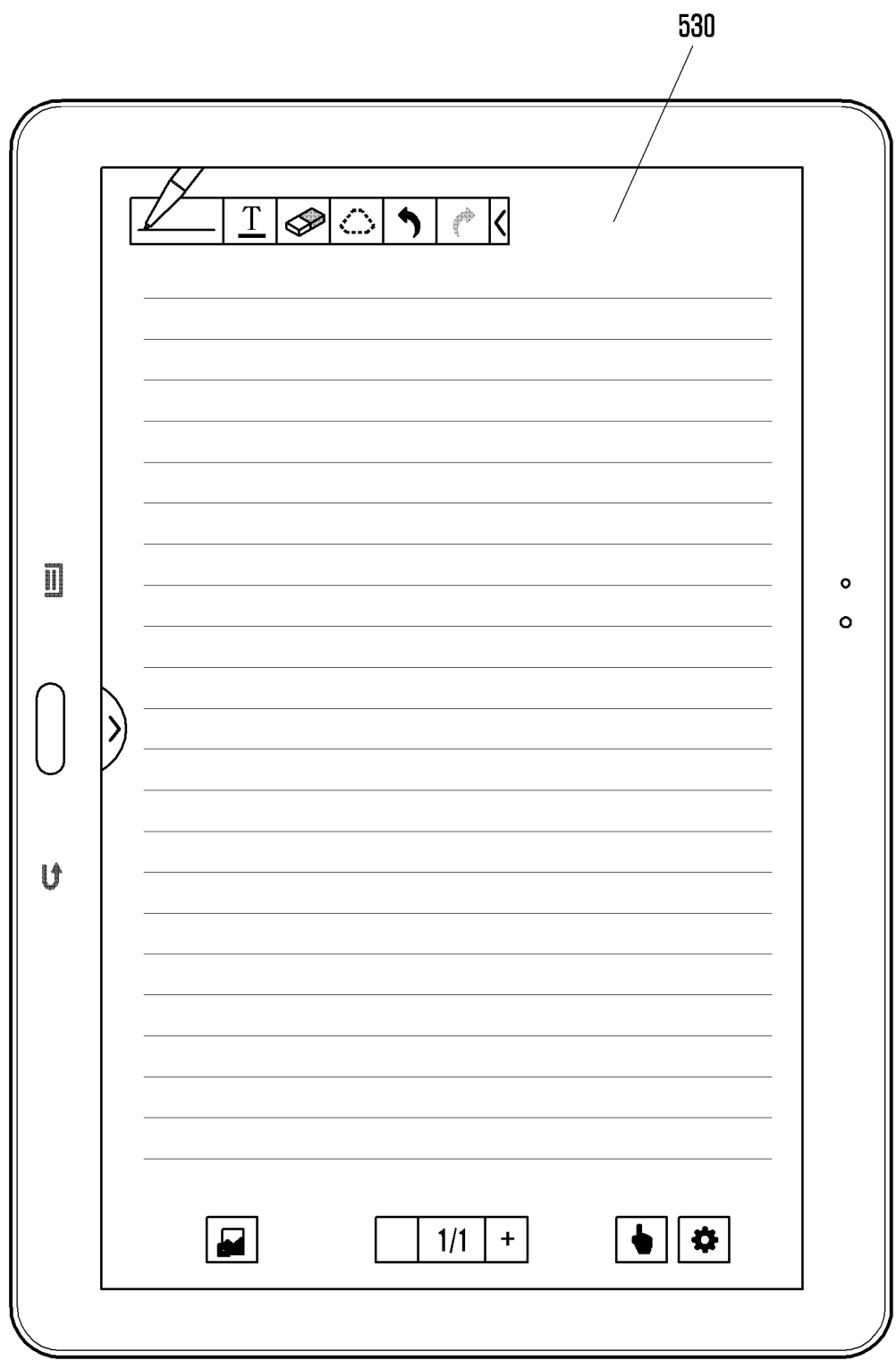

Referring to FIG. 5B, a handwriting application screen 530 is displayed on the touch screen 190. Specifically, when the shortcut icon (191a in FIG. 1A) linked to a handwriting application is selected on the touch screen 190 by a user, the control unit 110 executes the handwriting application and then displays the handwriting application screen 530 on the touch screen 190. The handwriting application may receive a user's handwriting, drawing, painting or sketching action through the input unit 166.

In alternative embodiments of the present disclosure, instead of the handwriting application, a drawing application or any other application (e.g., a game application, a Text-To-Speech (TTS) application, etc.) capable of receiving a user's input through the input unit 166 may be selectively executed. Namely, in various embodiments of the present disclosure, any application supporting or using the input unit 166 may be favorably used, and this disclosure may be applied to cases in which the illuminance sensor 171 is covered by a user who is using (e.g., clicking, dragging, handwriting, drawing, etc.) the input unit 166 on a certain application screen. Also, this disclosure may be applied to other type screens such as a widget screen, a setting screen, and the like as well as an application screen. In various embodiments of the present disclosure, any widget supporting or using the input unit 166 may be favorably used, and this disclosure may be applied to cases in which the illuminance sensor 171 is covered by a user who is using (e.g., touching, clicking, etc.) the input unit 166 on a certain widget screen.

Returning to FIG. 4, at operation S402, the portable device 100 detects an ambient illuminance.

Specifically, when any selected application is executed, the control unit 110 detects, using the illuminance sensor 171, an ambient illuminance around the portable device 100. The illuminance sensor 171 may output an illuminance signal (e.g., an analog or digital signal) corresponding to the detected illuminance to the control unit 110. Then, using the received illuminance signal, the control unit 110 may calculate illuminance (i.e., luminous intensity). Also, the control unit 110 may store the calculated illuminance as illuminance information in the storage unit 175. For a history management, this illuminance information may include an identifier, an illuminance value, an illuminance detection time (e.g., a detection time of the illuminance sensor 171), and/or current location information (e.g., an outdoor location measured using the GPS unit 155 or an indoor location measured using the communication unit 120 or 130). In an embodiment, the calculated illuminance may have a value ranging from 0 to 700 lux.

The illuminance of artificial lighting may be about 1,000 lux, the illuminance at an outdoor area in the middle of the day may be about 10,000 to 25,000 lux, and the illuminance of direct sunlight at an outdoor area may be about 32,000 to 130,000 lux. Additionally, the illuminance at sunrise or sunset may be about 400 lux, and the illuminance of a full moon near the equator may be about 1 lux. The calculated illuminance may be varied according to an illuminance range (i.e., from the maximum illuminance to the minimum illuminance) detectable by the illuminance sensor 171. Further, an ambient illuminance around the portable device 100 may be varied according to times and locations.

The control unit 110 may also detect an ambient illuminance at operation S401 as well as operation S402, using the illuminance sensor 171. For example, the control unit 110 may detect an ambient illuminance, using the illuminance sensor 171, when a user input (e.g., a touch of the input unit 166 or a user's touch) is received, according to a detection time cycle of the illuminance sensor 171 (e.g., 1 min, which is changeable), when the movement of the portable device 100 is detected by the sensor (e.g., the gyro sensor 173, a motion sensor, a geomagnetic sensor, etc.), or when electric power is supplied to the portable device 100.

At operation S403, the portable device 100 determines whether the detected illuminance is less than a threshold value.

Specifically, the control unit 110 compares the calculated illuminance with a predetermined threshold value and determines whether the detected ambient illuminance is less than the threshold value.

This threshold value may include a dynamic threshold value and a static threshold value. A user (or a manufacturer) may select one of the dynamic threshold value and the static threshold value through a setting page (510 in FIG. 5A) of the portable device 100. Then, the control unit 110 may determine whether the detected illuminance is less than the selected threshold value.

The control unit 110 may calculate a static threshold value by multiplying a constant by the maximum illuminance detectable by the illuminance sensor 171. For example, if the maximum detectable illuminance is 700 lux and if a predetermined constant is 0.10, a static threshold value is 70 lux. Similarly, if the maximum detectable illuminance is 700 lux and if a predetermined constant is 0.15, a static threshold value is 105 lux. Similarly, if the maximum detectable illuminance is 600 lux and if a predetermined constant is 0.10, a static threshold value is 60 lux. The maximum detectable illuminance of the illuminance sensor 171 may be fixed. Also, a static threshold value applied to a single portable device 100 may be constant. And also, the control unit 110 may read a static threshold value from the storage unit 175.

As should be understood by those skilled in the art, a static threshold value applied to various portable devices may be varied according to the maximum detectable illuminance and a predetermined constant.

A dynamic threshold value may be calculated by multiplying a constant by the detected ambient illuminance. Specifically, a presently (t=0) detected ambient illuminance may be compared with a dynamic threshold value calculated from a previously (t=−1) detected ambient illuminance. For example, if a previously detected ambient illuminance is 500 lux and if a predetermined constant is 0.15, a dynamic threshold value is 75 lux. In this case, if a presently detected ambient illuminance is 50 lux, the control unit 110 determines that the presently detected ambient illuminance is less than the dynamic threshold value. Similarly, if a previously detected ambient illuminance is 300 lux and if a predetermined constant is 0.15, a dynamic threshold value is 45 lux. In this case, if a presently detected ambient illuminance is 50 lux, the control unit 110 determines that the presently detected ambient illuminance is greater than the dynamic threshold value. For a history management, the control unit 110 may store detected ambient illuminance values in the storage unit 175.

In case the detected illuminance is not less than a threshold value, the portable device 100 returns to operation S402.

In contrast, if the detected illuminance is less than a threshold value, the portable device 100 detects a touch of the input unit 166 from the outside of a determination region at operation S404.

Figure 5C:
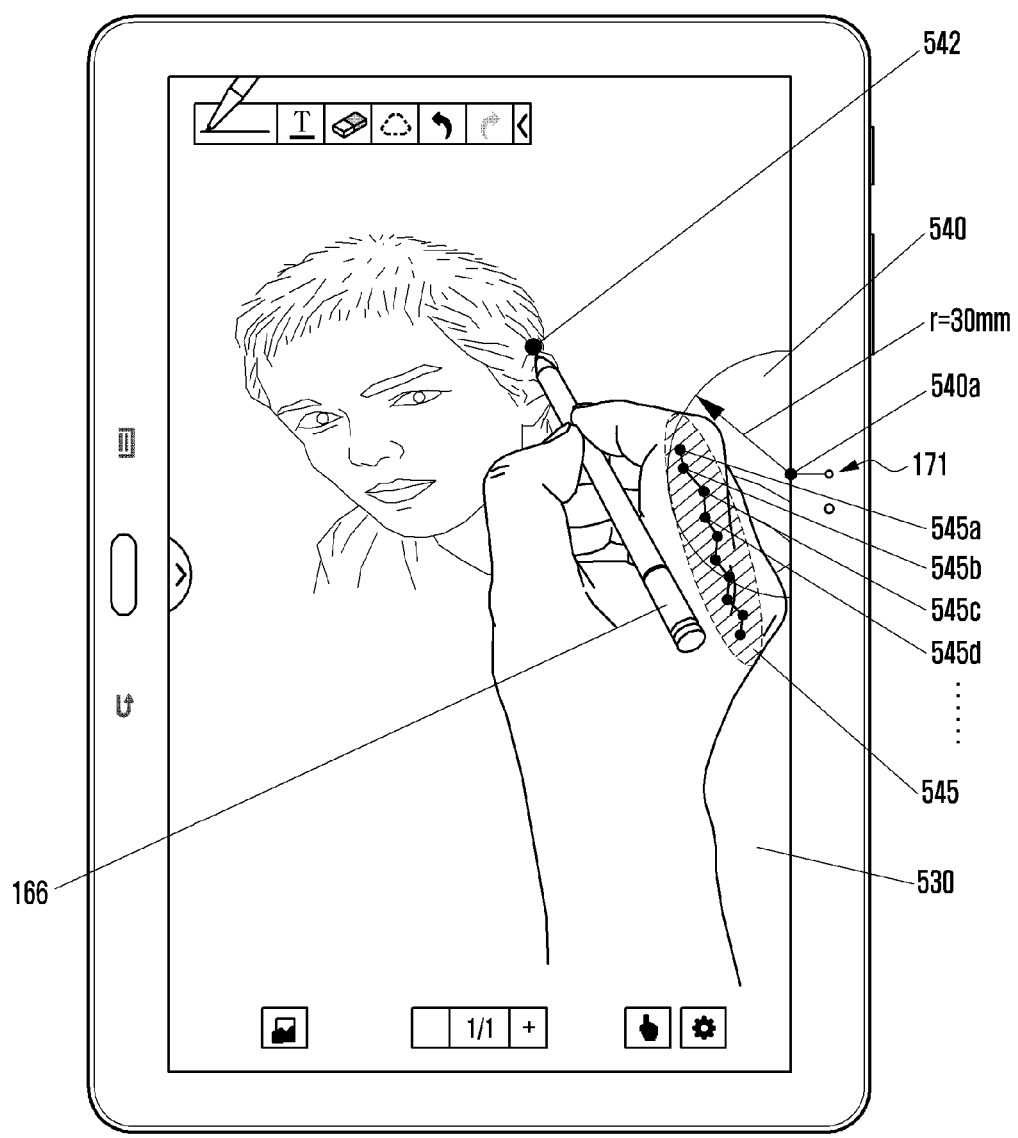

Specifically, referring to FIGS. 5C and 5D, the input unit 166 may perform the first touch 542 at the outside of the determination region 540 on the touch screen 190. Then, the control unit 110 may detect the first touch 542, using the touch screen 190 and the touch screen controller 195. Also, the control unit 110 may receive, from the touch screen controller 195, information about the first touch location (e.g., X1 and Y1 coordinates) corresponding to the first touch 542.

The control unit 110 may store the received first touch location information in the storage unit 175. The first touch location information may contain an identifier, a touch location, a touch detection time, and/or any other touch information (e.g., a touch pressure, a touch direction, touch duration, or the like).

Additionally, the control unit 110 may detect the first hovering (not shown), using the touch screen 190 and the touch screen controller 195. Also, the control unit 110 may receive, from the touch screen controller 195, information about the first hovering location (e.g., X8 and Y8 coordinates) corresponding to the first hovering.

The control unit 110 may store the received first hovering location information in the storage unit 175. The first hovering location information may contain a hovering location, a hovering detection time, and/or any other hovering information (e.g., a hovering height, a hovering direction, hovering duration, or the like).

A touch of the input unit 166 is a single point touch. Namely, the control unit 110 may detect a touch of the input unit 166 as a single point touch. In case the input unit 166 is an EMR type, a touch of the input unit 166 may be determined through the second touch panel. In contrast, if the input unit 166 is not an EMR type (e.g., a capacitive type), a touch of the input unit 166 may be determined depending on whether it is a single point touch or not.

Further, the input unit 166 may continuously perform a plurality of touches (e.g., the second touch, the third touch, etc.) at the outside of the determination region 540 on the touch screen 190. Then, the control unit 110 may detect such a continuous touch, using the touch screen 190 and the touch screen controller 195. Also, the control unit 110 may receive, from the touch screen controller 195, information about the second touch location (e.g., X2 and Y2 coordinates), the third touch location (e.g., X3 and Y3 coordinates), etc. corresponding to a continuous touch. The control unit 110 may store the received continuous touch location information in the storage unit 175. The continuous touch location information may contain each touch location, each touch detection time, and/or any other information about each touch (e.g., a touch pressure, a touch direction, touch duration, or the like).

A touch of the input unit 166 may include a touch by a user's finger. When a handwriting or drawing is entered by a user's finger on the touch screen 190, the control unit 110 may detect this touch, using the touch screen 190 and the touch screen controller 195.

Figure 6A:
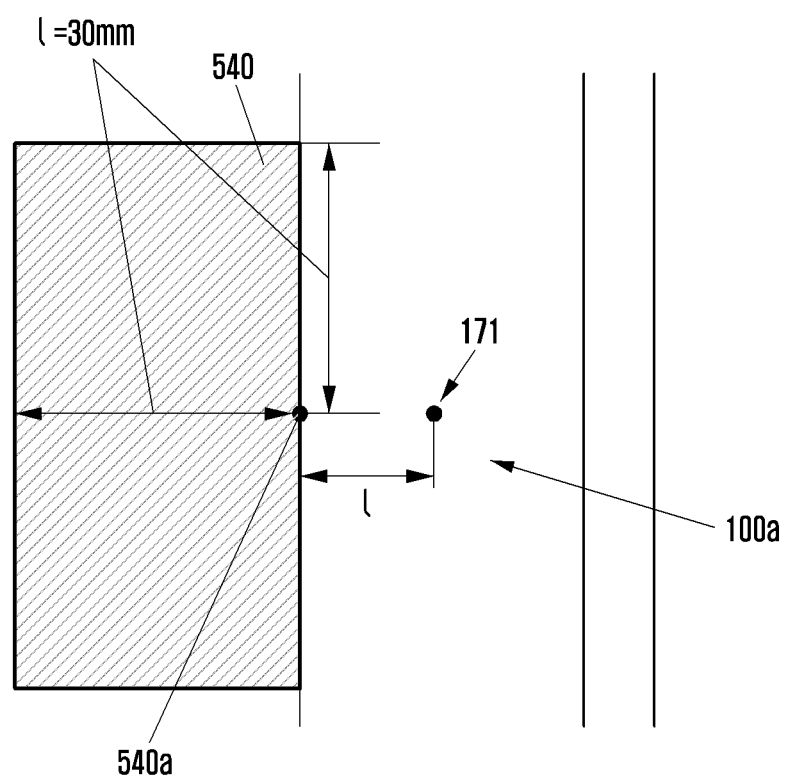
FIGS. 6A and 6B are diagrams illustrating a determination region of a touch screen according to an embodiment of the present disclosure.
Figure 6B:
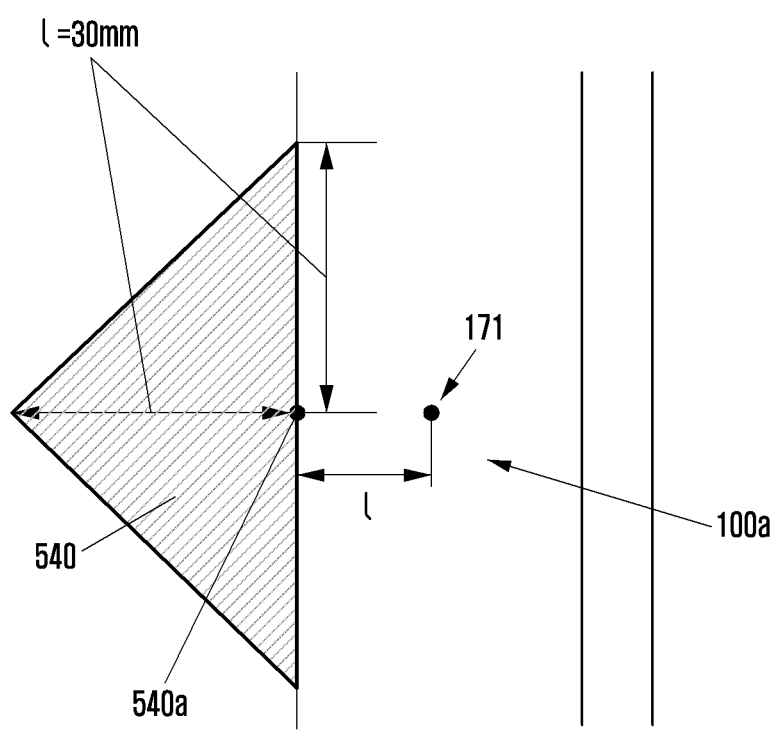

FIGS. 6A and 6B are diagrams illustrating a determination region of a touch screen according to an embodiment of the present disclosure.

As shown in FIGS. 5C and 5D, the determination region 540 may be a semicircle having a given radius (e.g., 30 mm) from a reference point 540a on an edge of the touch screen 190. The reference point 540a is the nearest point having the shortest distance (e.g., 8 mm) from the illuminance sensor 171 to the touch screen 190.

Alternatively, as shown in FIG. 6A, the determination region 540 may be a rectangle having a given length (e.g., 30 mm) in inward, upward and downward directions from a reference point 540a on the edge of the touch screen 190. The reference point 540a is the nearest point having the shortest distance (e.g., 8 mm) from the illuminance sensor 171 to the touch screen 190.

Alternatively, as shown in FIG. 6B, the determination region 540 may be a triangle having three vertexes of a given length (e.g., 30 mm) in inward, upward and downward directions from a reference point 540a on the edge of the touch screen 190. The reference point 540a is the nearest point having the shortest distance (e.g., 8 mm) from the illuminance sensor 171 to the touch screen 190.

The location of the reference point 540a may be varied. For example, the reference point 540a may be an intersection point between the edge of the touch screen 190 and a line segment from the illuminance sensor 171 to the first touch of the input unit 166. According to the location of the reference point 540a is varied, the determination region 540 may also be changed.

As shown in FIGS. 5C and 5D, the outline of the determination region 540 may be displayed. This outline may be displayed only for a given time (e.g., 1 sec, which is changeable) or not displayed. Also, when a touch 542 of the input unit 166 or a user's touch 545 is approaching the determination region 540 within a given distance (e.g., 20 mm), the control unit 110 may control the outline of the determination region 540 to be displayed distinctively from an application screen 530 on the touch screen 190.

As well understood by those skilled in the art, the radius (r) or length (l) of the determination region 540 may be varied. Also, the shape, size and location of the determination region 540 may be varied as well understood by those skilled in the art.

Using information about the determination region 540 and a touch location, the control unit 110 may determine whether a touch location of the input unit 166 is at the outside of the determination region 540.

At operation S405 in FIG. 4, the portable device 100 detects a user's touch from the inside of the determination region.

Specifically, referring to FIGS. 5C and 5D, a user's touch 545 may happen at the inside of the determination region 540 on the touch screen 190. Then, the control unit 110 may detect the user's touch 545 from the determination region 540, using the touch screen 190 and the touch screen controller 195. Also, the control unit 110 may receive, from the touch screen controller 195, information about a user touch location (e.g., X5 and Y5 coordinates) corresponding to the user's touch 545. The control unit 110 may store the received user touch location information in the storage unit 175. The user touch location information may contain an identifier, a user touch location, a user touch detection time, and/or any other user touch information (e.g., a user touch pressure, a user touch direction, user touch duration, or the like).

The user's touch 545 may be a multi point touch. Namely, the control unit 110 may detect the user's touch 545 as a multi point touch. In case a user holds the input unit 166 and, for handwriting or drawing, continuously touches the portable device 100, a user's hand blade or palm heel may come into contact with the touch screen 190. A hand blade refers to a lower part from a little finger to wrist which can be in contact with the touch screen. A palm heel refers to a fleshy rounded base of the human palm.

Depending on handwriting or drawing posture in holding the input unit 166, a contact area between a user's hand blade or palm heel and the touch screen 190 may be varied. In this disclosure, the user touch 545 refers to a touch caused by contact between the touch screen 190 and a user's hand blade or palm heel.

The number of touches that constitute a multi point touch detected from the touch screen 190 may be varied according to a contact area between the touch screen 190 and a hand blade or palm heel. Also, the number of touches in a multi point touch detected from the touch screen 190 is not greater than the number of touches detectable from the touch screen 190.

The control unit 110 may detect a user's touch 545 caused by contact of hand blade or palm heel from the touch screen 190. This user's touch 545 may be a multi point touch formed of a plurality of single point touches (e.g., 545a, 545b, 545c, 545d, etc.). The control unit 110 may store this user touch location information in the storage unit 175. The user touch location information may contain the number of touches in a multi point touch, a multi point touch time, a multi point touch detection time, and/or any other multi point touch information (e.g., a touch pressure, a touch direction, touch duration, or the like).

The control unit 110 may determine the user's touch 545 as a single set, based on contact time between the user's touch 545 and the touch screen 190 (e.g., within a contact time interval of 200 msec, which is changeable, between adjacent single point touches).

The control unit 110 may determine, using both the multi point touch and the determination region 540, whether the user's touch 545 is detected from the determination region 540. Additionally, using the number of touches detected from the inside of the determination region 540 among all touches in the multi point touch, the control unit 110 may determine whether the user's touch 545 is detected from the determination region 540. Also, a user (or a manufacturer) may define the number of touches for determining whether the user's touch is detected from the determination region 540, through a setting page (510 in FIG. 5A) of the portable device 100.

Although FIGS. 5C and 5D show a case of a right-handed user, this is exemplary only and not to be considered as a limitation. Alternatively, in a case of a left-handed user or any other case detectable through the sensor unit 170 in the portable device 100 may be applied to this disclosure.

At operation S406 in FIG. 4, the portable device 100 maintains the screen brightness.

Specifically, in case the detected illuminance is less than a given threshold value, the control unit 110 may maintain the current screen brightness in response to a touch of the input unit 166 at the outside of the determination region 540 and a user's touch at the inside of the determination region 540. This maintenance of the screen brightness may mean inactivation of a screen brightness auto mode. The control unit 110 may maintain the screen brightness only for a given time (e.g., 30 sec, which is changeable through the setting page 510).

Also, in case the detected illuminance is less than a given threshold value, and if a touch of the input unit 166 is detected from the outside of the determination region 540 or if a user's touch is detected from the inside of the determination region 540, the control unit 110 may deselect the selected auto brightness item 521 without displaying the setting page 510 and/or the popup window 520 as shown in FIG. 5A.

Namely, for a given time (e.g., 30 sec, which is changeable through the setting page 510), the control unit 110 may not adjust the screen brightness of the touch screen 190 regardless of detected illuminance, but maintain a current brightness, i.e., the screen brightness corresponding to the previously detected ambient illuminance.

The control unit 110 may offer a feedback to a user in response to the maintenance of the screen brightness for a given time. This feedback may be one of a visual feedback, an audible feedback, and a tactile feedback, or any combination thereof.

A visual feedback may be offered through a predetermined visual effect (e.g., a separate image or an animation such as fade-in or fade-out) displayed distinctively from objects displayed on the touch screen 190. An audible feedback may be offered through a predetermined sound outputted by at least one of the first and second speakers 163a and 163b. A tactile feedback may be offered through a vibration generated by the vibration motor 164. Such a feedback may be offered until the screen brightness auto mode is activated again. Also, such a feedback may be selected and/or changed, together with a duration time (e.g., 500 msec) thereof, in the setting page 510 of the portable device 100.

When the screen brightness is maintained for the given time by the touch 542 of the input unit 166 or the user's touch, the control unit 110 can detect the touch 542 of the input unit 166 or the user's touch 545 before the given time passes. If such a touch is detected, the control unit 110 may activate again the screen brightness auto mode.

Figure 7:
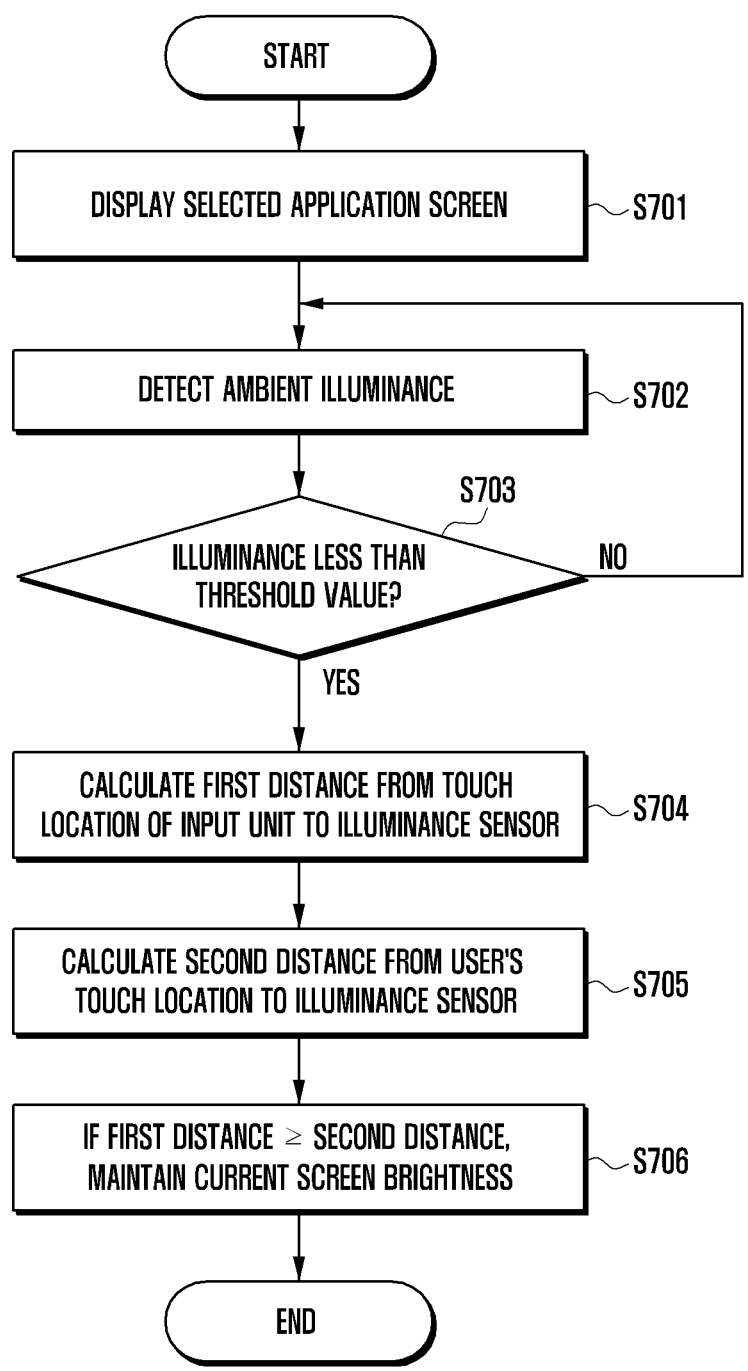
FIG. 7 is a flow diagram illustrating a method for controlling the screen brightness of a portable device according to an embodiment of the present disclosure.
Figure 8:
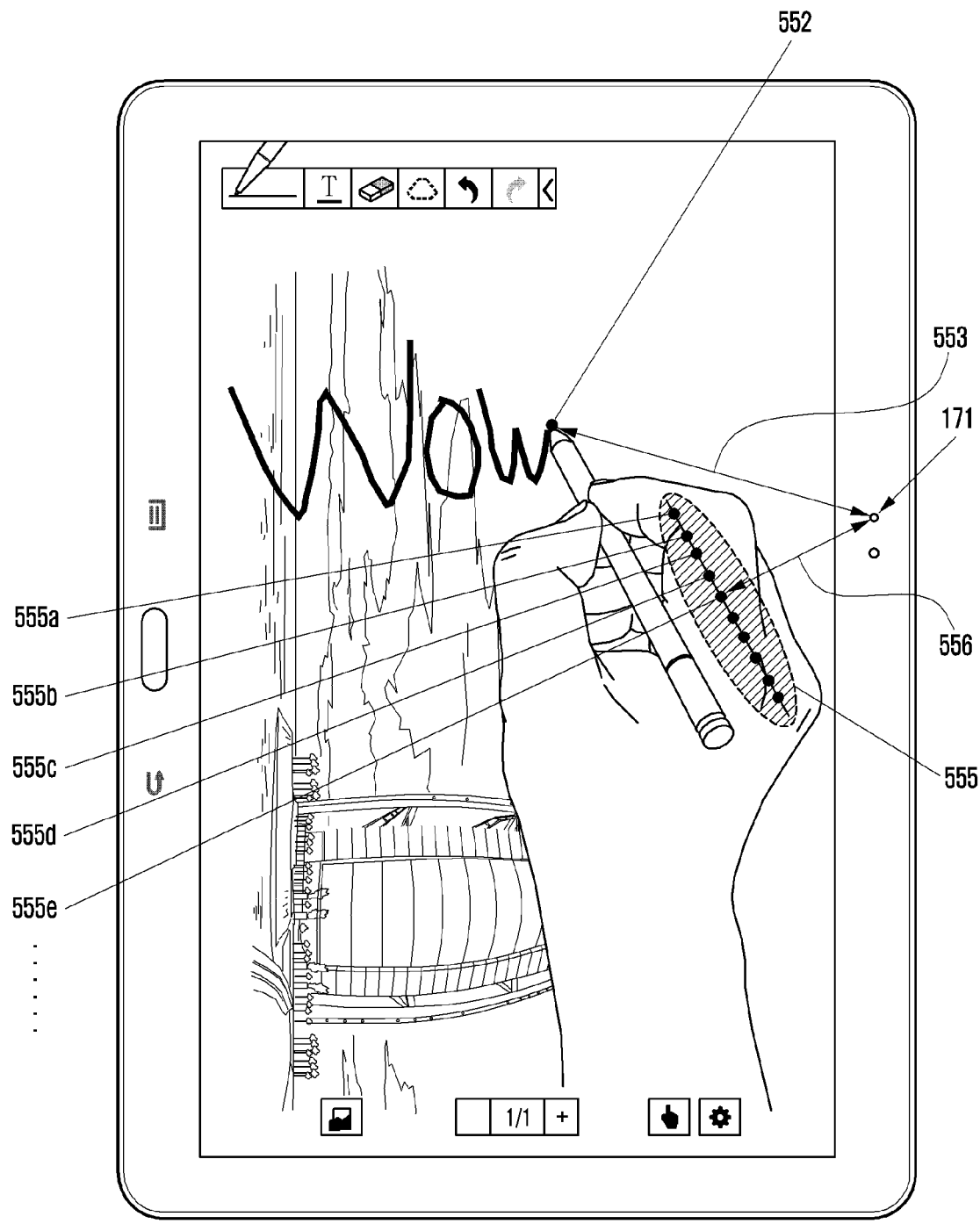
FIG. 8 is a diagram illustrating a method for controlling the screen brightness of a portable device according to an embodiment of the present disclosure.

FIG. 7 is a flow diagram illustrating a method for controlling the screen brightness of a portable device according to an embodiment of the present disclosure. Additionally, FIG. 8 is a diagram illustrating a method for controlling the screen brightness of a portable device according to an embodiment of the present disclosure.

Referring to FIG. 7, the portable device displays a screen of a selected application at operation S701.

As discussed above with reference to FIG. 5A, when the auto brightness item 521 and the OK button 522 are selected in the popup window 520 on the setting page 510, the control unit 110 activates the screen brightness auto mode.

Then, as discussed above with reference to FIG. 5B, the handwriting application screen 530 is displayed on the touch screen 190 when the shortcut icon (191a in FIG. 1A) linked to the handwriting application is selected on the touch screen 190 by a user.

Since this operation S701 in FIG. 7 is the same as the above-discussed operation S401 in FIG. 4, a detailed description thereof will be omitted.

At operation 5702 in FIG. 7, the portable device detects an ambient illuminance.

Namely, when a selected application is executed, the control unit 110 detects an ambient illuminance around the portable device 100, using the illuminance sensor 171.

Since this operation 5702 in FIG. 7 is the same as the above-discussed operation S402 in FIG. 4, a detailed description thereof will be omitted.

At operation 5703 in FIG. 7, the portable device determines whether the detected illuminance is less than a given threshold value.

Namely, the control unit 110 compares a calculated illuminance with a given threshold value and thereby checks whether the calculated illuminance is less than the threshold value.

Since this operation 5703 in FIG. 7 is the same as the above-discussed operation S403 in FIG. 4, a detailed description thereof will be omitted.

At operation 5704 in FIG. 7, the portable device calculates the first distance from a touch location of the input unit to the illuminance sensor.

Specifically, referring to FIG. 8, the input unit 166 may perform the tenth touch 552 on the touch screen 190. Then, the control unit 110 may detect the tenth touch 552, using the touch screen 190 and the touch screen controller 195. Also, the control unit 110 may receive, from the touch screen controller 195, information about the tenth touch location (e.g., X10 and Y10 coordinates) corresponding to the tenth touch 552. Then, the control unit 110 may store the received tenth touch location information in the storage unit 175. The tenth touch location information may contain a touch location, a touch detection time, and/or any other touch information (e.g., a touch pressure, a touch direction, touch duration, or the like). This touch of the input unit 166 is a single point touch, and thus the control unit 110 may detect a touch of the input unit 166 as a single point touch.

Using the tenth touch location information, the control unit 110 may calculate the first distance 553 from the tenth touch 552 to the illuminance sensor 171. The location of the illuminance sensor 171 is fixed at the outside of the touch screen 190. The control unit 110 may calculate the first distance 553, as the absolute value, considering the direction of the portable device 100 detected by the sensor and the influence of the coordinate system.

Further, the input unit 166 may continuously perform a plurality of touches (e.g., the eleventh touch, the twelfth touch, etc. corresponding to handwriting or drawing) on the touch screen 190. Then, the control unit 110 may detect such a continuous touch, using the touch screen 190 and the touch screen controller 195. Also, the control unit 110 may receive, from the touch screen controller 195, information about the eleventh touch location (e.g., X11 and Y11 coordinates), the twelfth touch location (e.g., X12 and Y12 coordinates), etc. corresponding to a continuous touch. The control unit 110 may store the received continuous touch location information in the storage unit 175. The continuous touch location information may contain each touch location, each touch detection time, and/or any other information about each touch (e.g., a touch pressure, a touch direction, touch duration, or the like).

Using the eleventh touch location information, the control unit 110 may calculate the eleventh distance from the eleventh touch to the illuminance sensor 171.

Meanwhile, a touch of the input unit 166 may include a touch by a user's finger. When a handwriting or drawing is entered by a user's finger on the touch screen 190, the control unit 110 may calculate a distance from such a touch (e.g., the thirteenth touch) by a user's finger to the illuminance sensor 171.

Namely, at operation S705 in FIG. 7, the portable device calculates the second distance from a user touch location to the illuminance sensor.

Specifically, referring to FIG. 8, a user's touch 555 may happen on the touch screen 190. Then, the control unit 110 may detect the user's touch 555, using the touch screen 190 and the touch screen controller 195. Also, the control unit 110 may receive, from the touch screen controller 195, information about a user touch location (e.g., X15 and Y15 coordinates) corresponding to the user's touch 555. The control unit 110 may store the received user touch location information in the storage unit 175. The user touch location information may contain a user touch location, a user touch detection time, and/or any other user touch information (e.g., a user touch pressure, a user touch direction, user touch duration, or the like).

The user's touch 555 is a multi point touch. Namely, the control unit 110 may detect the user's touch 555 as a multi point touch. In case a user holds the input unit 166 and, for handwriting or drawing, continuously touches the portable device 100, a user's hand blade or palm heel may come into contact with the touch screen 190. A hand blade refers to a lower part from a little finger to wrist which can be in contact with the touch screen. A palm heel refers to a fleshy rounded base of the human palm.

Depending on handwriting or drawing posture in holding the input unit 166, a contact area between a user's hand blade or palm heel and the touch screen 190 may be varied. In this disclosure, the user touch 555 refers to a touch caused by contact between the touch screen 190 and a user's hand blade or palm heel.

The control unit 110 may detect a user's touch 555 caused by contact of hand blade or palm heel from the touch screen 190. This user's touch 555 may be a multi point touch formed of a plurality of single point touches (e.g., 555a, 555b, 555c, 555d, etc.).

The control unit 110 may store this user touch location information in the storage unit 175. The user touch location information may contain the number of touches in a multi point touch, a multi point touch time, a multi point touch detection time, and/or any other multi point touch information (e.g., a touch pressure, a touch direction, touch duration, or the like).

The control unit 110 may determine the user's touch 555 as a single set, based on contact time between the user's touch 555 and the touch screen 190 (e.g., within a contact time interval of 200 msec, which is changeable, between adjacent single point touches).

The control unit 110 may determine, as a reference location, the nearest single point touch location 555e from the illuminance sensor 171 among single point touch locations. Then, the control unit 110 may calculate the second distance 556 on the basis of the nearest single point touch location 555e. Alternatively, the control unit 110 may calculate the second distance 556 from an average location of the single point touches. The control unit 110 may calculate the second distance 556, as the absolute value, considering the direction of the portable device 100 detected by the sensor and the influence of the coordinate system.

At operation S706 in FIG. 7, if the first distance is equal to or longer than the second distance, the portable device maintains the current screen brightness.

Specifically, the control unit 110 may compare the calculated first distance 553 with the calculated second distance 556. For example, referring to FIG. 8, the first distance 553 is longer than the second distance 556. In this case, the control unit 110 may maintain the current screen brightness for a given time (e.g., 30 sec). The maintenance of the screen brightness may correspond to inactivation of the screen brightness auto mode.

The control unit 110 may maintain the screen brightness until the first distance 553 becomes shorter than the second distance 556. If the first distance 553 becomes shorter than the second distance 556, the control unit 110 may activate again the screen brightness auto mode.

Since this operation S706 in FIG. 7 is similar to the above-discussed operation S406 in FIG. 4, a detailed description thereof will be omitted.

As fully discussed hereinbefore, in various embodiments of the present disclosure, a portable device and a screen brightness control method thereof may maintain the current screen brightness in overall consideration of a detected ambient illuminance, a touch of an input unit, and a user's direct touch, even if any change in the ambient illuminance happens in a screen brightness auto mode.

Additionally, in various embodiments of the present disclosure, a portable device and a screen brightness control method thereof may maintain the current screen brightness in response to a touch of the input unit and a user's direct touch when an ambient illuminance detected through the illuminance sensor is less than a threshold value, even if the portable device is in a screen brightness auto mode.

In this case, the portable device and the screen brightness control method may define a determination region on the touch screen to detect a touch of the input unit at the outside of the determination region and to detect a user's direct touch at the inside of the determination region.

In an alternative case, the portable device and the screen brightness control method may calculate the first distance between a touch of the input unit to the illuminance sensor and the second distance between a user's direct touch to the illuminance sensor so as to determine whether to maintain the current screen brightness.

In the above cases, various types of the input unit such as an EMR type, a capacitive type, or a resistive type may be favorably used for the present disclosure.

The above-described embodiments of the present disclosure can be implemented in hardware, firmware or via the execution of software or computer code that can be stored in a recording medium such as a Compact Disc ROM (CD ROM), a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an Application-Specific Integrated Circuit (ASIC) or Field-Programmable Gate Array (FPGA). As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity.

The above-discussed method is described herein with reference to flowchart illustrations of user interfaces, methods, and computer program products according to various embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine code, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

While this present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. A method for controlling screen brightness of a portable device, the method comprising:
   detecting an ambient illuminance around the portable device by an illuminance sensor;
   if the detected ambient illuminance is less than a threshold value, calculating a first distance between the illuminance sensor and a first touch of an input unit detected from a touch screen;

calculating a second distance between the illuminance sensor and a second touch detected from the touch screen; and if the first distance is equal to or greater than the second distance, controlling the touch screen to maintain a current screen brightness thereof, wherein the first touch occurs concurrently with the second touch.

2. The method of claim 1, further comprising:
activating a screen brightness auto mode of the portable device,
wherein the maintaining of the current screen brightness includes inactivating the screen brightness auto mode.

3. The method of claim 1, wherein the threshold value includes one of a dynamic threshold value changed depending on the detected ambient illuminance and a static threshold value determined by multiplying a constant by the maximum illuminance detected at the portable device.

4. The method of claim 1, wherein the first touch of the input unit is detected as a single point touch.

5. The method of claim 1, wherein the second touch is detected as a multi point touch which has a plurality of single point touches.

6. The method of claim 1, wherein the second touch includes, in case a user holds the input unit, a touch caused by contact between the touch screen and a user's hand blade, or a touch caused by contact between the touch screen and a user's palm heel.

7. The method of claim 1, wherein the current screen brightness is maintained for a time defined according to an illuminance detection cycle of the illuminance sensor.

8. The method of claim 1, further comprising:
in response to the maintaining of the current screen brightness, offering at least one of a visual feedback, an audible feedback, and a tactile feedback.

9. A method for controlling screen brightness of a portable device, the method comprising:
detecting an ambient illuminance around the portable device;
if the detected ambient illuminance is less than a threshold value, detecting a first touch of an input unit from the outside of a determination region defined on a touch screen;
detecting a second touch from the determination region; and
maintaining a current screen brightness in response to detection of the first touch of the input unit and the second touch,
wherein the first touch occurs concurrently with the second touch.

10. The method of claim 9, further comprising:
activating a screen brightness auto mode of the portable device,
wherein the maintaining of the current screen brightness includes inactivating the screen brightness auto mode.

11. The method of claim 9, wherein the first touch of the input unit is detected as a single point touch, and wherein the second touch is detected as a multi point touch which has a plurality of single point touches.

12. The method of claim 9, wherein the threshold value includes one of a dynamic threshold value changed depending on the detected ambient illuminance and a static threshold value determined by multiplying a constant by the maximum illuminance detected at the portable device.

13. The method of claim 9, wherein at least one of a shape, a size and a location of the determination region is changeable.

14. A portable device comprising:
an illuminance sensor configured to detect an ambient illuminance around the portable device;
a touch screen having an adjustable screen brightness; and
a control unit configured to control the illuminance sensor and the touch screen,
wherein if the detected ambient illuminance is less than a threshold value, and if a first distance between the illuminance sensor and a first touch of an input unit detected from the touch screen is equal to or greater than a second distance between the illuminance sensor and a second touch detected from the touch screen, the control unit is further configured to control the touch screen to maintain a current screen brightness thereof, and
wherein the first touch occurs concurrently with the second touch.

15. The portable device of claim 14, wherein the control unit is further configured to inactivate a screen brightness auto mode of the portable device when maintaining the current screen brightness.

16. The portable device of claim 14, wherein the control unit is further configured to detect the first touch of the input unit as a single point touch, and to detect the second touch as a multi point touch which has a plurality of single point touches.

17. The portable device of claim 14, wherein the control unit is further configured to maintain the current screen brightness for a time defined according to an illuminance detection cycle of the illuminance sensor.

18. A portable device comprising:
an illuminance sensor configured to detect an ambient illuminance around the portable device;
a touch screen having an adjustable screen brightness; and
a control unit configured to control the illuminance sensor and the touch screen,
wherein if the detected ambient illuminance is less than a threshold value, the control unit is further configured to maintain a current screen brightness in response to detection of a first touch of an input unit from the outside of a determination region defined on the touch screen and detection of a second touch from the determination region, and
wherein the first touch occurs concurrently with the second touch.

19. The portable device of claim 18, wherein the control unit is further configured to inactivate a screen brightness auto mode of the portable device when maintaining the current screen brightness.

20. A portable device comprising:
an illuminance sensor configured to detect an ambient illuminance around the portable device;
a touch screen having an adjustable screen brightness; and
a control unit configured to control the illuminance sensor and the touch screen,
wherein when the detected ambient illuminance is less than a threshold value, the control unit is further configured to maintain a current screen brightness in response to a first touch of a user's finger detected from the outside of a determination region defined on the touch screen and a second touch of a user's palm detected from the determination region, and
wherein the first touch occurs concurrently with the second touch.

* * * * *